United States Patent
Totsuka et al.

(10) Patent No.: US 6,533,081 B2
(45) Date of Patent: Mar. 18, 2003

(54) BRAKE FLUID PRESSURE RETAINING APPARATUS

(75) Inventors: Hirohiko Totsuka, Saitama (JP); Masaaki Yamaguchi, Saitama (JP); Keisuke Katsuta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/952,232

(22) Filed: Sep. 12, 2001

(65) Prior Publication Data

US 2002/0029943 A1 Mar. 14, 2002

(30) Foreign Application Priority Data

Sep. 12, 2000 (JP) ........................................ 2000-275783

(51) Int. Cl.[7] ................................................. B60T 7/12
(52) U.S. Cl. ........................................................ 188/110
(58) Field of Search ................................ 183/110, 113; 701/70, 74; 303/89, 141; 192/13 A

(56) References Cited

U.S. PATENT DOCUMENTS 4,572,335 A * 2/1986 Koblet ....................... 188/72.1
5,935,041 A * 8/1999 Tsukamoto et al. ......... 477/195
6,370,466 B1 * 4/2002 Hada et al. .................. 188/110

FOREIGN PATENT DOCUMENTS

JP    P 2000-351360    12/2000

* cited by examiner

Primary Examiner—Jack Lavinder
Assistant Examiner—C. T Bartz

(57) ABSTRACT

A brake fluid pressure retaining apparatus RU is mounted on a vehicle equipped with an automatic transmission CVT and a driving motor control unit DCU. The driving motor control unit switches the magnitude of creep driving force between a greater condition and a smaller condition in accordance with a depression of the brake pedal, so that the driving force is made smaller at a depression of the brake pedal than at a release of the brake pedal. The brake fluid pressure retaining apparatus continuously retains brake fluid pressure within a wheel cylinder WC after releasing a brake pedal BP. The retained brake fluid pressure is released after the driving force increases to the greater condition and when a first setting time TM1 passes. When undesirable backward movement of the vehicle is detected by a backward movement state detection device BKD, the retained brake fluid pressure is released after a second setting time TM2, which decreasingly changes from a time longer than the first setting time in accordance with a throttle angle signal V_θTH, passes instead of the first setting time.

3 Claims, 13 Drawing Sheets

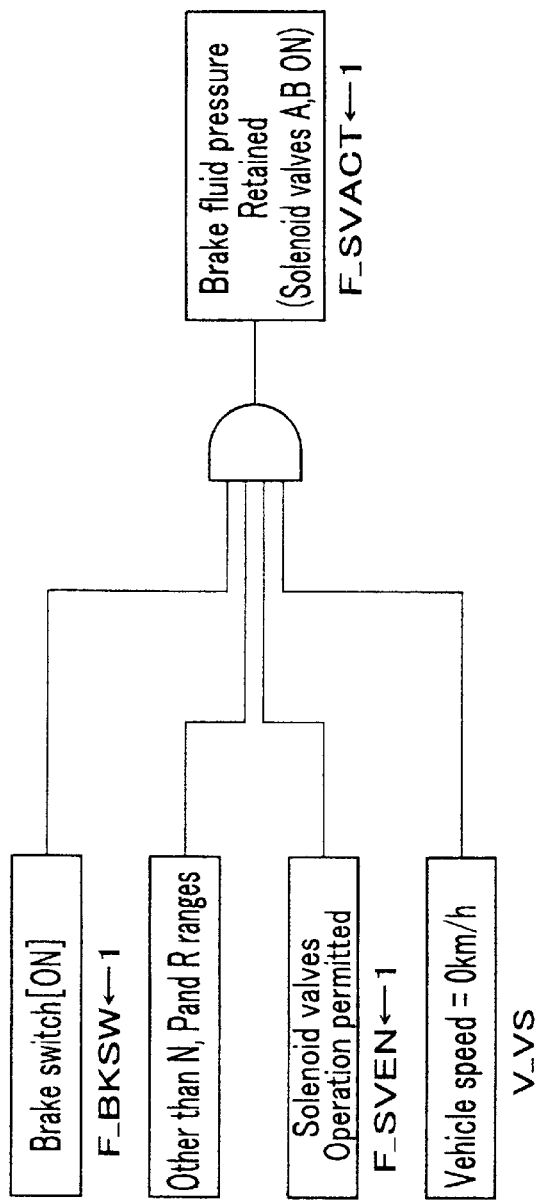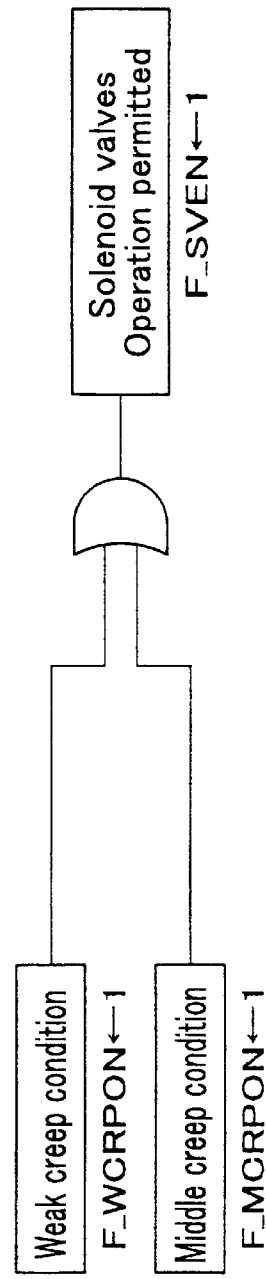
FIG.6A
FIG.6B

BRAKE FLUID PRESSURE RETAINING APPARATUS

RELATED APPLICATIONS

This application claims priority to Japanese Patent Application No. P2000-275783 filed on Sep. 11, 2000 in Japan. The contents of the aforementioned application are hereby incorporated by reference.

FIELD OF THE INVENTION

The present invention relates to a brake fluid pressure retaining apparatus for continuously retaining brake fluid pressure within a wheel cylinder after releasing the brake pedal. The brake fluid pressure retaining apparatus is mounted on a vehicle, which is equipped with an automatic transmission and a driving force control unit for making a creep driving force smaller at a depression of the brake pedal than at a release of the brake pedal.

BACKGROUND OF THE INVENTION

Various brake fluid pressure retaining apparatus are known. The brake fluid pressure retaining apparatus continuously retains brake fluid pressure within a wheel cylinder after releasing the brake pedal so that the braking force continuously acts on the vehicle. For example, the applicants disclose a brake fluid pressure retaining apparatus in Japanese Patent Application No. Hei-11-164621 (unpublished), in which brake fluid pressure passages are provided with a solenoid valve and a bypass passage bypassing the solenoid valve is provided with a restriction. The brake fluid pressure retaining apparatus gradually decreases and releases the retained brake fluid pressure through the restrictions when a certain time (about 1 second) passes after the driving force is changed into a greater condition. For this reason, the brake fluid pressure retaining apparatus ensures a starting operation of the vehicle on an up slope as well as a smooth starting operation of the vehicle on a down slope, at which a displacement force due to the vehicle's own weight affects on, without a sudden feel of the driver.

However, there is a possibility that the vehicle undesirably moves or displaces backwards when starting from an up slope, because of the relations between the inclination of the slope, the retained brake fluid pressure and the like. If the driver releases the retained brake fluid pressure while the vehicle rolling down the slope, the backward displacement amount of the vehicle is increased and the driver experiences an awkward feel. Therefore, a smooth starting operation of the vehicle is required on an up slope. Meanwhile, a smooth start without sudden impacts is also required on a down slope.

Accordingly, the object of the present invention is to provide a brake fluid pressure retaining apparatus, which ensures a smooth starting operation of the vehicle on an up slope with decreased backward displacement amount of the vehicle and also ensures a smooth starting operation on a down slope.

The term "backward displacement" is also referred to as a "backward movement" throughout the specification and the claims.

SUMMARY OF THE INVENTION

According to a first aspect of the present invention, there is provided a brake fluid pressure retaining apparatus in combination with a vehicle equipped with a driving force control unit, the driving force control unit which transmits a driving force from a driving motor to driving wheels when a transmission is set in a driving range even after a depression of an accelerator pedal is released at a certain or lower vehicle speed, and which switches the magnitude of the driving force transmitted to the driving wheels between a greater condition and a smaller condition in accordance with a depression of a brake pedal, so that the driving force is made smaller at a depression of the brake pedal than at a release of the brake pedal, the brake fluid pressure retaining apparatus comprising:

a brake fluid pressure passage connecting a master cylinder and a wheel cylinder;

a solenoid valve provided in the brake fluid pressure passage and switchable between a communicating position, where the brake fluid pressure passage communicates, and a shut-off position, where the brake fluid pressure passage is shut off;

a bypass passage equipped with a restriction for communicating the master cylinder and the wheel cylinder respective of the shut-off position of the solenoid valve; and a control unit for switching the solenoid valve between the communicating position and the shut-off position, wherein said control unit is constituted such that the solenoid valve is switched to the shut-off position for retaining brake fluid pressure within the wheel cylinder when the vehicle is stopped with the brake pedal depressed, and that the solenoid valve is switched to the communicating position for releasing the retained brake fluid pressure when a first setting time passes after the driving force is increased to the greater condition due to the release of the brake pedal, and wherein said brake fluid pressure retaining apparatus further comprises a backward movement state determination device for determining a backward movement state of the vehicle, and wherein said control unit is constituted such that when the vehicle is determined as being in a backward movement state, said solenoid valve is switched to the communicating position after a second setting time passes, so as to retain brake fluid pressure for a period longer than the first setting time.

With such a constitution of the brake fluid pressure retaining apparatus, because brake fluid pressure is continuously retained within the wheel cylinder after releasing the brake pedal, the vehicle is prevented from undesirably rolling down a slope upon starting from the slope. The control means releases the retained brake fluid pressure when the setting time passes after the driving force is increased to the greater condition due to release of the brake pedal. When doing so, the brake fluid pressure is not retained constantly. The retained brake fluid pressure is gradually decreased by the flow rate control of the bypass passage equipped with a restriction. For this reason, the braking force is released gradually and slowly, which leads to a smooth starting operation of the vehicle on both up and down slopes without any sudden impacts.

Meanwhile, when the backward movement state determination device determines that the vehicle is undesirably rolling down a slope (backward movement detected) after the depression of the brake pedal is released and during the first setting time, the control means releases the retained brake fluid pressure when the second setting time passes, so as to retain the brake fluid pressure longer than the first setting time and continuously restrict the backward movement of the vehicle. The second setting time is for extending or delaying the first setting time. Because the second setting time is set only when the vehicle undesirably rolls down a slope, unnecessary brake dragging does not arise at a start of the vehicle unless the vehicle moves backwards.

Herein, the term "a certain vehicle speed" indicates that the vehicle is stopped (or the vehicle speed=0 km/h) or the vehicle runs at a vehicle speed just before stopping. Therefore, if the certain vehicle speed is set to be 0 km/h, the term "at a certain or lower vehicle speed" only indicates the vehicle speed of 0 km/h. Alternatively, as an example of the preferred embodiment to be described later, if the certain vehicle speed is set to be 5 km/h, the term "at a certain or lower vehicle speed" indicates a vehicle speed range from 0 km/h to 5 km/h.

Further, the term "smaller condition" or "made smaller" includes an instance when the driving force is decreased to zero (in the preferred embodiment to be described later, the instance when the engine is stopped). Therefore, the term "the driving force is increased to the greater condition" includes (1) an instance that the driving force arises from zero and thereafter increases (in the preferred embodiment, the instance that the driving force is increased from the engine stop condition to the strong creep condition) and (2) an instance that the existing driving force further increases (in the preferred embodiment, the instance that the driving force is increased from the weak creep condition to the strong creep condition).

As to the "first setting time", a sufficient time (for example 1 second) is required for decreasing the brake fluid pressure to such an extent that the driver does not experience any sudden feels when the solenoid valve is switched to the communicating position and the retained brake fluid pressure is instantly released. However, other optional values may be set as the first setting time in accordance with the flow rate control of the restriction.

As mentioned above, the "second setting time" is set for decreasing the backward movement of the vehicle. However, the "second setting time" is also set for eliminating unnecessary brake dragging. As long as substantially extending the "first setting time", the "second setting time" may be set desirably with the use of any means or manners.

According to this brake fluid pressure retaining apparatus, if the vehicle does not undesirably move backwards, a smooth starting operation of the vehicle can be carried out without a sudden impact. This can be achieved by the braking force that is based on the brake fluid pressure gradually decreasing through the restriction during the first setting time.

Meanwhile, when the vehicle undesirably moves backwards, the brake fluid pressure is retained longer by the second setting time in comparison with the situation when the vehicle does not move backwards. Thereby, backward displacement amount of the vehicle becomes small. Further, because of the restriction D, the longer the brake fluid pressure retaining apparatus retains the brake fluid pressure, the smaller the retained brake fluid pressure becomes at the time of releasing the retained brake fluid pressure. Therefore, the release of the brake fluid pressure is carried out smoothly. As a result, even if the vehicle undesirably moves backwards, a smooth starting operation of the vehicle can be achieved with the backward displacement amount decreased.

Preferably, in the aforementioned brake fluid pressure retaining apparatus, the second setting time becomes shorter as the load of the driving motor increases.

With such a constitution of the brake fluid pressure retaining apparatus, as the load of the driving motor increases, the second setting time becomes shorter. In other words, when the load of the driving motor is greater, it is assumed that the backward movement restriction force derived from the driving force is also greater. Therefore, the backward movement of the vehicle can be prevented even if the second setting time becomes shorter. Further, shortening the second setting time prevents unnecessary brake dragging. Meanwhile, when the load of the driving motor is smaller, it is assumed that the backward movement restriction force derive from the driving force is smaller. Therefore, in order to decrease the backward displacement amount of the vehicle, the second setting time is not made shorter.

Herein, the term "the load of the driving motor" includes those understood as a rotational speed (Ne) of the engine or the motor, a driving force transmission capacity (starting torque) of the starting clutch, a throttle angle ($\theta$TH) and the like.

According to this brake fluid pressure retaining apparatus, it is possible to decrease unnecessary brake dragging because the second setting time becomes shorter in accordance with the increment of the load of the driving motor. Decreasing the retention time of the brake fluid pressure corresponds with the driver's intention of quickly starting the vehicle with the increased load of the driving motor.

According to another aspect of the present invention, there is provided a brake fluid pressure retaining apparatus in combination with a vehicle equipped with a driving force control unit, the driving force control unit which transmits a driving force from a driving motor to driving wheels when a transmission is set in a driving range even after a depression of an accelerator pedal is released at a certain or lower vehicle speed, and which switches the magnitude of the driving force transmitted to the driving wheels between a greater condition and a smaller condition in accordance with a depression of a brake pedal, so that the driving force is made smaller at a depression of the brake pedal than at a release of the brake pedal, the brake fluid pressure retaining apparatus comprising:

a brake fluid pressure passage connecting a master cylinder and a wheel cylinder;

a solenoid valve provided in the brake fluid pressure passage and switchable between a communicating position, where the brake fluid pressure passage communicates, and a shut-off position, where the brake fluid pressure passage is shut off;

a bypass passage equipped with a restriction for communicating the master cylinder and the wheel cylinder irrespective of the shut-off position of the solenoid valve; and a control unit for switching the solenoid valve between the communicating position and the shut-off position, wherein said control unit is constituted such that the solenoid valve is switched to the shut-off position for retaining brake fluid pressure within the wheel cylinder when the vehicle is stopped with the brake pedal depressed, and that the solenoid valve is switched to the communicating position for releasing the retained brake fluid pressure when a first setting time passes after the driving force is increased to the greater condition due to the release of the brake pedal, and wherein said brake fluid pressure retaining apparatus further comprises a backward movement state determination device for determining a backward movement state of the vehicle, and wherein said control unit is constituted such that when the vehicle is determined as being in a backward movement state, said solenoid valve is switched to the communicating position after a second setting time, which decreasingly changes from a time longer than the first setting time in accordance with the increment of the load of the driving motor, passes instead of the first setting time, so as to release the retained brake fluid pressure.

In this brake fluid pressure retaining apparatus, the manner of preventing the backward movement of the vehicle is the same as that of the brake fluid pressure retaining apparatus according to the first aspect of the invention.

However, when the backward movement determination device determines that the vehicle is undesirably rolling down a slope (backward movement detected) after the depression of the brake pedal is released and during the first setting time, the brake fluid pressure retaining apparatus releases the retained brake fluid pressure when the second setting time instead of the first setting time passes. The second setting time decreasingly changes from a time longer than the first setting time in accordance with the increment of the load of the driving motor. In other words, when the load of the driving motor is small, it is assumed that the backward movement restriction force derived from the driving force is also small. Therefore, the second setting time is set to be longer than the first setting time. On the contrary, when the load of the driving motor is great, it is assumed that the backward movement restriction force derived from the driving force is great. Therefore, the second setting time may be set to be shorter. With such a constitution, it is possible to decrease the backward displacement amount of the vehicle and also to decrease the occurrence of brake dragging.

Herein, the terms "a certain vehicle speed", "smaller condition", "made smaller", "a first setting time", "the load of the driving motor" are the same as those of the brake fluid pressure retaining apparatus according to the first aspect of the invention.

Likewise the brake fluid pressure retaining apparatus according to the first aspect of the invention, the "second setting time" is set both for decreasing the backward displacement amount of the vehicle and for eliminating unnecessary brake dragging. In the preferred embodiment to be described later, the second setting time is set so as to be decreased from 2 seconds at the maximum to 0 second in accordance with the load of the driving motor. The "second setting time" may be set desirably with the use of any means or manners.

According to this brake fluid pressure retaining apparatus, if the vehicle does not undesirably move backwards, a smooth starting operation of the vehicle can be carried out without a sudden impact. This can be achieved by the braking force that is based on the brake fluid pressure gradually decreasing through the restriction during the first setting time.

Meanwhile, if the vehicle undesirably moves backwards, the release of the brake fluid pressure is carried out when the second setting time passes. The second setting time decreasingly changes from a time longer than the first setting time in accordance with the increment of the load of the driving motor. For this reason, when the load of the driving motor is small (viz. when the driving force is small), the brake fluid pressure is retained longer than the first setting time. Backward displacement amount of the vehicle is therefore decreased. Further, because of the restriction D, the longer the brake fluid pressure retaining apparatus retains the brake fluid pressure, the smaller the retained brake fluid pressure becomes at the time of releasing the retained brake fluid pressure. Therefore, the release of the brake fluid pressure is carried out smoothly. As a result, even if the vehicle undesirably moves backwards, a smooth starting operation of the vehicle can be achieved with the backward displacement amount decreased. Moreover, when the load of the driving motor is great (viz. when the driving force is great), the brake fluid pressure is retained shorter than the first setting time. This can eliminate unnecessary brake dragging. Decreasing the retention time of the brake fluid pressure corresponds with the driver's intention of quickly starting the vehicle with the increased load of the driving motor.

BRIEF DESCRIPTION OF THE DRAWINGS

Preferred embodiments of the present invention will be described below, by way of example only, with reference to the accompanying drawings, in which:

FIGS. 3A through 3C show the principle of detecting backward displacement of the vehicle, in which FIG. 3A is an explanatory view showing the configuration of helical gears and electromagnetic pick-ups, FIG. 3B is an explanatory view showing a pulse phase for x direction of FIG. 3A, and FIG. 3C is an explanatory view showing a pulse phase for y direction of FIG. 3A;

FIGS. 6A and 6B are the control logic of the brake fluid pressure retaining apparatus, in which FIG. 6A shows the logic for retaining brake fluid pressure, and FIG. 6B shows the logic for permitting an operation of a solenoid valve;

FIGS. 7A through 7C show control of a driving force control unit illustrated in FIG. 1, in which FIG. 7A shows the control logic for switching to a weak creep condition, FIG. 7B shows the control logic for switching to a strong creep condition for driving, and FIG. 7C shows the control logic for switching to a middle creep condition;

FIG. 9 shows the control logic of the brake fluid pressure retaining apparatus, in which

FIGS. 10A and 10B show control of the driving force control unit, in which FIGS. 10A and 10B show the control logic for switching to the strong creep condition. Herein, FIG. 10A shows a backward displacement detecting version, and FIG. 10B shows a vehicle movement detecting version;

FIGS. 11A and 11B show control of the driving motor stopping unit, in which FIGS. 11A and 11B show the control logic for automatically actuating the engine. Herein, FIG. 11A shows a backward displacement detecting version, and FIG. 11B shows a vehicle movement detecting version;

DESCRIPTION OF THE PREFERRED EMBODIMENT

Figure 1:
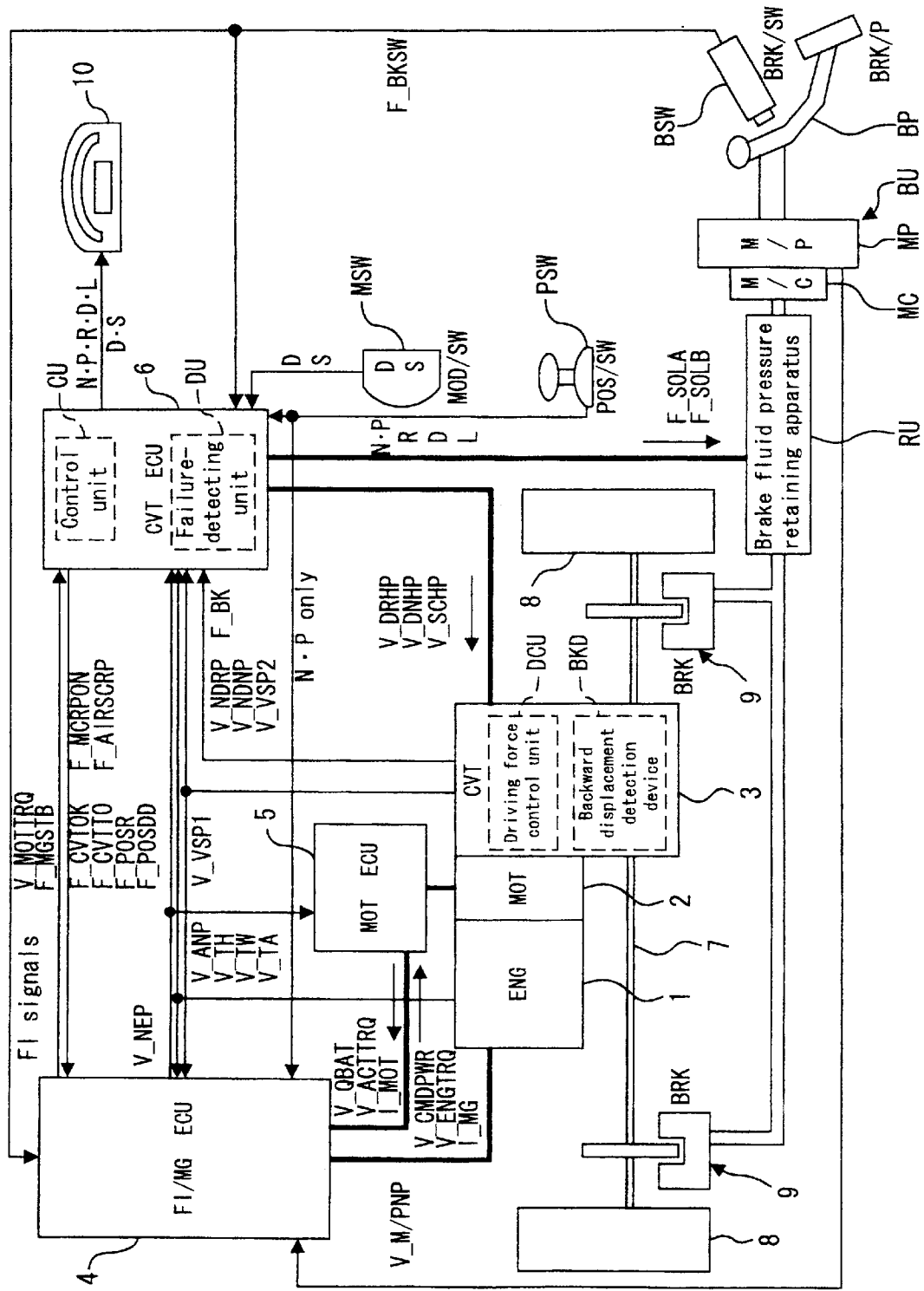
FIG. 1 shows a system configuration of a vehicle equipped with a brake fluid pressure retaining apparatus according to the present invention.

With reference to the attached drawings, a brake fluid pressure retaining apparatus according to the present invention will be described.

The brake fluid pressure retaining apparatus continuously retains brake fluid pressure within a wheel cylinder after releasing the brake pedal to continuously make the braking force act on the vehicle. However, the way of retaining brake fluid pressure differs when the vehicle does not undesirably displace backwards and when the vehicle undesirably rolls down a slope.

(1) In a case that the vehicle does not undesirably displace backwards (normal mode); the brake fluid pressure retaining apparatus (control unit) releases the retained brake fluid pressure either when a first setting time passes after the driving force of the vehicle is increased to a greater condition (strong creep condition) or when the accelerator pedal is depressed after the driving force is increased to the greater condition and before the first setting time passes.

(2) In a case that the vehicle undesirably rolls down a slope (backward displacement detecting mode); the brake fluid pressure retaining apparatus (control unit) releases the retained brake fluid pressure after the driving force of the vehicle is increased to the greater condition and when a second setting time passes. The second setting time decreasingly changes in accordance with the increment of a throttle angle.

In this embodiment, a vehicle with the brake fluid pressure retaining apparatus is provided with a driving force control unit and/or a driving motor stopping unit. The driving force control unit decreases creep driving force when the driving motor is idling and the brake pedal is depressed under a certain or lower vehicle speed. The driving motor stopping unit automatically stops the driving motor while the vehicle stops. The vehicle shown in this embodiment is a hybrid type vehicle having an engine and an electric motor as a driving motor, and is provided with a belt-type continuously variable transmission (hereinafter referred to as CVT). The engine is an internal combustion engine operates on gasoline and the like, and the electric motor operates on electricity. The driving motor of the vehicle is not restricted merely to an engine or a motor. Similarly, the transmission is not restricted to CVT and it may be of any know type as long as being an automatic transmission.

In creep running, the vehicle with an automatic transmission moves slowly as if it creeps along the ground when the transmission is set to a running range, such as a D (Drive) or R (Reverse) range and the accelerator pedal is released (the driving motor is idling).

System Configuration of Vehicle and Others

The system configuration of a vehicle according to the present invention will be described with reference to FIG. 1.

Engine (Driving Motor), CVT (Transmission) and Motor (Driving Motor)

The vehicle is equipped with an engine 1 and a motor 2 as a driving motor, and is provided with CVT 3 as a transmission. Engine 1 is controlled at a fuel injection electronic control unit (hereinafter referred to as FI ECU). The FI ECU is integrally constructed with a management electronic control unit (hereinafter referred to as MG ECU), and it is incorporated in a fuel injection/management electronic control unit 4 (hereinafter referred to as FI/MG ECU). Motor 2 is controlled at a motor electronic control unit 5 (hereinafter referred to as MOT ECU). Further, CVT 3 is controlled at a CVT electronic control unit 6 (hereinafter referred to as CVT ECU).

Figure 2:
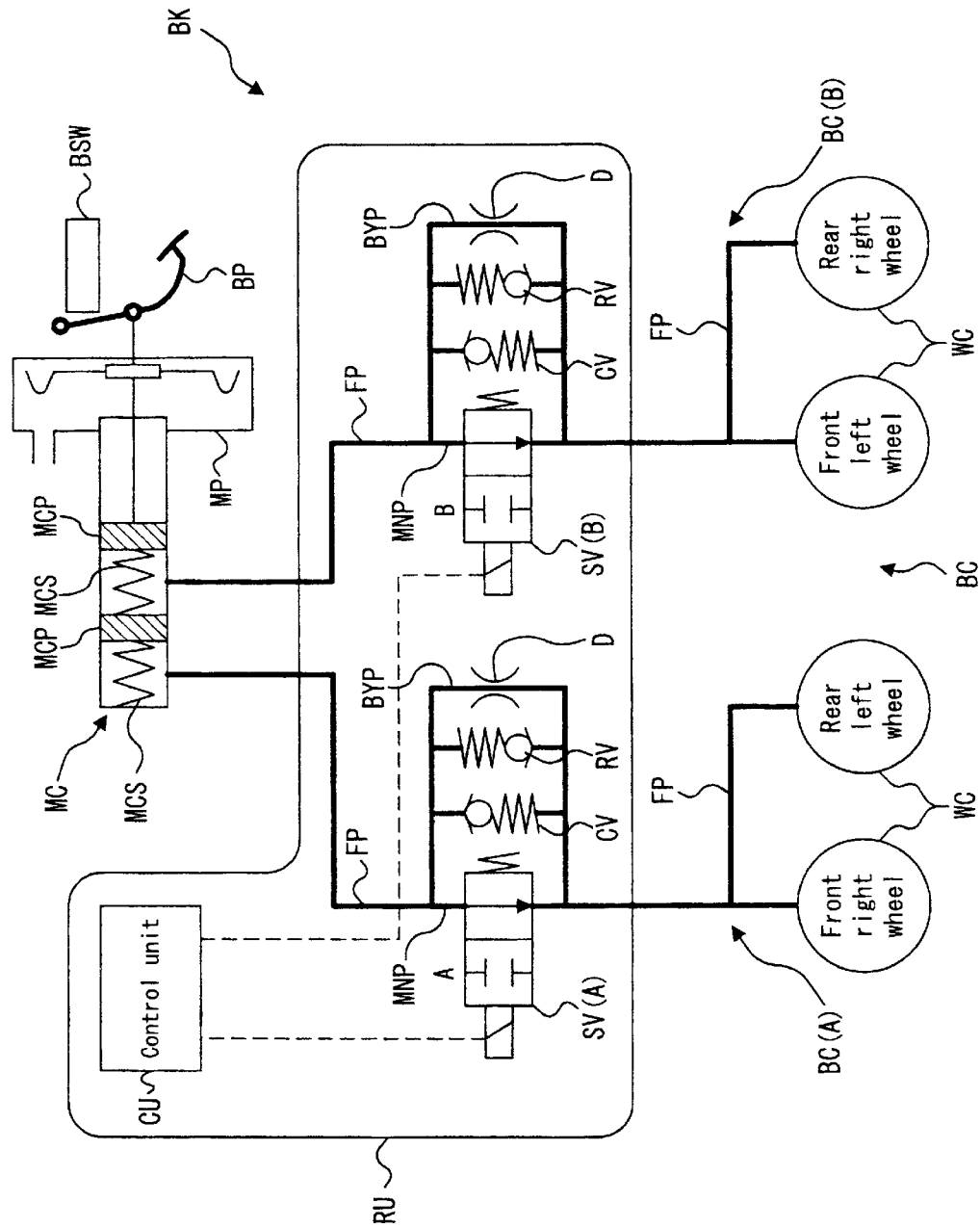
FIG. 2 shows a constitution of the brake fluid pressure retaining apparatus together with a hydraulically operated braking apparatus.

A drive axle 7 provided with two driving wheels 8, 8 is mounted to the CVT 3. Each driving wheel 8 is provided with a disc brake 9, which includes a wheel cylinder WC and the like (FIG. 2). The wheel cylinders WC of the disc brakes 9 are connected to a master cylinder MC through a brake fluid pressure retaining apparatus RU. When the driver depresses the brake pedal BP, the brake pedal load generated is transmitted to the master cylinder MC through the master power MP. The brake switch BSW detects whether or not the brake pedal BP is depressed.

Engine 1 is an internal combustion engine which makes use of thermal energy. Engine 1 drives the two driving wheels 8 through CVT 3 and drive axle 7. In order to improve fuel consumption, engine 1 may be automatically stopped while the vehicle stops. For this reason, the vehicle is provided with a driving motor stopping unit for automatically stopping engine 1 when a certain automatic engine stop condition is satisfied.

Motor 2 has an assist mode for assisting the engine drive with the use of electric energy from a battery (not shown). Motor 2 has a regeneration mode for converting the kinetic energy derived from the rotation of drive axle 7 into electric energy. When the engine does not require an assist from the assist mode (such as for starting on a down slope or deceleration of the vehicle), the converted electric energy is stored in the battery. Further, motor 2 has an actuation mode for actuating engine 1.

CVT 3 includes an endless belt wound between a drive pulley and a driven pulley to enable a continuously variable gear ratio by changing the winding radius of the endless belt. The winding radius change is achieved by changing each pulley width. CVT 3 engages a starting clutch and an output shaft to transmit the output of engine 1 converted by the endless belt into drive axle 7 through gears at the output side of the starting clutch. The vehicle equipped with CVT 3 enables creep running while engine 1 is idling, and such a vehicle can vary the creep driving force.

Positioning Switch

Range positions of the positioning switch PSW are selected by a shift lever. These range positions are selected from a P range for parking the vehicle, an N range as a neutral range, an R range for backward running, a D range for normal running, and an L range for obtaining a sudden acceleration or strong engine brake. The term "running range" indicates a range position, at which the vehicle can move. In this vehicle, the running range includes the D range, L range and R range. When the positioning switch PSW selects the D range, a D mode as a normal running mode and an S mode as a sports mode can be selected by a mode switch MSW. Information from the positioning switch PSW and the mode switch MSW is transmitted to CVT ECU 6 and a meter 10. Meter 10 indicates the range information and the mode information selected by the positioning switch PSW and the mode switch, respectively.

In this preferred embodiment, reduction of the creep driving force (switching operation to the middle creep condition and the weak creep condition) is carried out while the positioning switch PSW is set in the D or L range. The strong creep condition is retained while the positioning switch PSW is set in the R range. The driving force is not transmitted to the driving wheels 8 while the positioning switch PSW is set in the N or P range. However, the driving force transmission capacity is decreased and the driving force is substantially switched to the weak creep condition.

ECU and Others

The FI ECU contained in FI/MG ECU 4 controls the amount of fuel injection to achieve the optimum air fuel ratio, and it also generally controls engine 1. Various kinds of information such as a throttle angle and conditions of engine 1 are transmitted to the FI ECU such that engine 1 is controlled based on this information. The MG ECU contained in FI/MG ECU 4 mainly controls MOT ECU 5 as well as determining the automatic engine stop conditions and automatic engine actuation conditions. The MG ECU receives information regarding the conditions of motor 2 and other information such as the conditions of engine 1 from the FI ECU, and based on this information it sends instructions about the mode switching of motor 2 to MOT ECU 5. Further, the MG ECU receives information such as the conditions of CVT 3, conditions of engine 1, range information of the positioning switch PSW, conditions of motor 2 and the like, and based on this information it determines whether engine 1 should be automatically stopped or automatically actuated.

MOT ECU 5 controls motor 2 based on a control signal from FI/MG ECU 4. The control signal from FI/MG ECU 4 includes mode information instructing actuation of engine 1 by motor 2, assistance of the engine actuation or regeneration of electric energy, and an output required value to motor 2, and MOT ECU 5 sends an order to motor 2 based on this information. Further, MOT ECU 5 receives information from motor 2 and transmits information such as the amount of generated energy and the capacity of the battery to FI/MG ECU 4.

CVT ECU 6 controls the transmission gear ratio of CVT 3, the engaging force of the starting clutch and the like. Various kinds of information such as the conditions of CVT 3, conditions of engine 1, range information of the positioning switch PSW and the like is transmitted to CVT ECU 6, and based on this information CVT ECU 6 transmits a signal to CVT 3. The signal includes control of the hydraulic pressure of each cylinder provided at the drive pulley and the driven pulley of CVT 3, and control of the hydraulic pressure of the starting clutch.

As shown in FIG. 2, CVT ECU 6 comprises a control unit CU for the ON/OFF control (shut-off or Off/communicate or Open) of the solenoid valves SV(A), SV(B) of the brake fluid pressure retaining apparatus RU. CVT ECU 6 transmits a signal to the brake fluid pressure retaining apparatus RU for turning ON and OFF the solenoid valves SV(A), SV(B). CVT ECU 6 also determines the switching of the creep driving force and transmits the determined information to the driving force control unit DCU of CVT 3. CVT ECU 6 also comprises a failure-detecting unit DU for detecting a malfunction of the brake fluid pressure retaining apparatus RU.

Brake

Disk brakes 9 are constructed such that a disk rotor rotatable with driving wheel 8 is pressed between the brake pads moved by the wheel cylinder WC (FIG. 2) and braking force is obtained by the frictional force therebetween. Brake fluid pressure within the master cylinder MC is transmitted to the wheel cylinders WC through the brake fluid pressure retaining apparatus RU.

The brake fluid pressure retaining apparatus RU continuously retains the brake fluid pressure within the wheel cylinder WC after the depression of the brake pedal BP is released, so as to continuously make the braking force act on the vehicle. Further, the brake fluid pressure retaining apparatus RU continues to retain the brake fluid pressure under certain conditions even after the driving force is increased to a strong creep condition. The brake fluid pressure retaining apparatus RU comprises a control unit CU within CVT ECU 6. Constitution of the brake fluid pressure retaining apparatus RU will be described later in greater detail with reference to FIG. 2.

A master cylinder MC is a device for converting a brake pedal depression into hydraulic pressure. In order to assist brake pedal depression, a master power MP is provided between the master cylinder MC and the brake pedal BP. The master power MP enhances braking force by applying negative pressure of engine 1 or compressed air to the driver's brake pedal depression force. A brake switch BSW is provided at the brake pedal BP to detect.whether or not the brake pedal BP is depressed.

Driving Force Control Unit

The driving force control unit DCU of the vehicle is incorporated in CVT 3. The driving force control unit DCU variably controls the driving force transmission capacity of the starting clutch, thereby changing creep driving force. The driving force control unit DCU determines to change the magnitude of the creep driving force. The driving force control unit DCU comprises CVT ECU 6, which transmits a hydraulic pressure command value to a linear solenoid valve. The linear solenoid valve controls the engagement hydraulic pressure of the starting clutch based on the determination result of the driving force control unit DCU.

In this embodiment, the creep driving force is adjusted based on the engaging force of the starting clutch (the driving force transmission capacity), and the driving force of the vehicle includes three conditions: (1) a strong condition; (2) a weak condition; and (3) a middle condition between the strong and weak conditions. The driving force transmission capacity at each condition is predetermined to be greater in the strong condition, less in the weak condition, and intermediate in the middle condition. In this embodiment, the strong condition is referred to as a strong creep condition, the weak condition is referred to as a weak creep condition, and the middle condition is referred to as a middle creep condition.

Further, the strong creep condition includes two driving force levels, i.e., a strong level and a weak level. The strong level is referred to as a strong creep condition, and the weak level is referred to as a strong creep condition for driving. In the strong creep condition, the driving force is adjusted in order to keep the vehicle stationary on a slope having an inclination angle of 5 degrees, and this condition is achieved when the vehicle speed is at 5 km/h or lower. In the strong creep condition for driving, the driving force is adjusted in to be less than that in the strong creep condition. The strong creep condition for driving is a preliminary condition before switching to the weak creep condition, and this conditions is achieved when the vehicle speed is over 5 km/h. In the weak creep condition, almost no driving force is obtained. In the middle creep condition, the driving force is controlled substantially at a mid point between the strong creep condition and the weak creep condition. The middle creep condition is an intermediate condition when the driving force is decreased stepwise in the process of switching from the strong creep condition to the weak creep condition. The strong creep condition is achieved when the accelerator pedal is released (idling condition) and the positioning switch PSW selects a running range, such as a D range, an L range or a R range, and when the brake pedal BP is released. In the strong creep condition, the vehicle moves slowly as if it creeps along the ground. If the driver depresses the brake pedal BP in this situation, the weak creep condition is achieved. The vehicle stops or moves at an extremely low speed (almost no driving force is obtained) in the weak creep condition.

The term "greater condition" recited in the claims indicates the strong creep condition except for the strong creep condition for driving and when the vehicle speed is at 5 km/h or lower, and the term "smaller condition" indicates the weak creep condition.

The driving force control unit DCU controls the driving force transmission capacity of the starting clutch and switches to the predetermined driving force in each creep condition when CVT ECU 6 determines conditions (hereinafter described) required for a weak creep condition, middle creep condition, strong creep condition or a strong creep condition for driving. The driving force control unit DCU determines the above conditions at CVT ECU 6, and it transmits a hydraulic pressure command value to a linear solenoid valve of CVT 3, where the engagement hydraulic pressure of the starting clutch is controlled. In the driving force control unit DCU, the driving force transmission capacity (engagement force) of the starting clutch is adjusted at CVT 3 based on the hydraulic pressure command value. The driving force transmission capacity is therefore changed and the creep driving force is adjusted. Because the driving force control unit DCU decreases the driving force, the fuel consumption of the vehicle is improved. The term "driving force transmission capacity" indicates the maximum driving force (driving torque) transmitted by the starting clutch.

When a failure-detecting unit DU detects a malfunction of the brake fluid pressure retaining apparatus RU, the switching operation of the driving force control unit DCU to the weak creep condition is restricted.

Driving Motor Stopping Unit

The driving motor stopping unit incorporated in the vehicle includes the FI/MG ECU 4 and other elements. The driving motor stopping unit enables an automatic engine stop operation while the vehicle stops. The automatic engine stop conditions are determined at the FI/MG ECU 4 and CVT ECU 6. The automatic engine stop conditions will be described later. When all of the automatic engine stop conditions are satisfied, FI/MG ECU 4 sends an engine stop order to engine 1 to automatically stop engine 1. Because the driving motor stopping unit automatically stops engine 1, the vehicle's fuel consumption improves.

FI/MG ECU 4 and CVT ECU 6 determine automatic engine actuation conditions while the driving motor stopping unit automatically stops engine 1. When all of the automatic engine actuation conditions are satisfied, FI/MG ECU 4 sends an engine actuation order to MOT ECU 5. MOT ECU 5 further transmits an engine actuation order to motor 2. Motor 2 then automatically actuates engine 1, and at the same time, the driving force is switched to the strong creep condition. The automatic engine actuation conditions will be described later.

When the failure-detecting unit DU detects a malfunction of the brake fluid pressure retaining apparatus RU, operation of the driving motor stopping unit is prohibited.

Backward Movement Detection Device

Figure 3A:
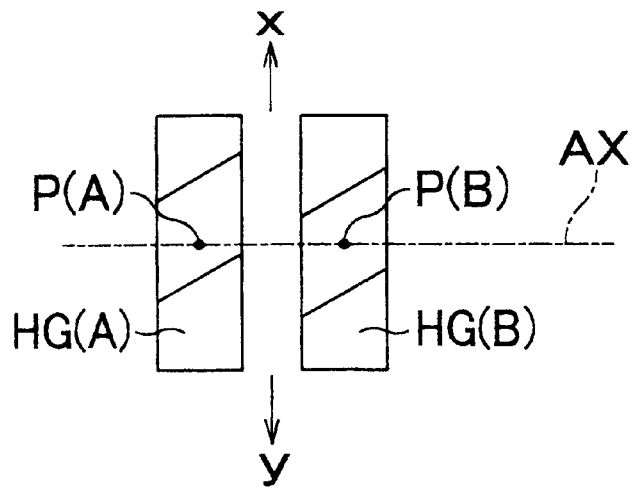
Figure 3B:
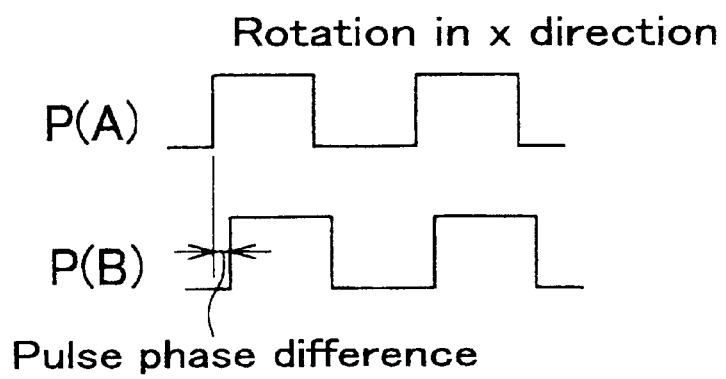
Figure 3C:
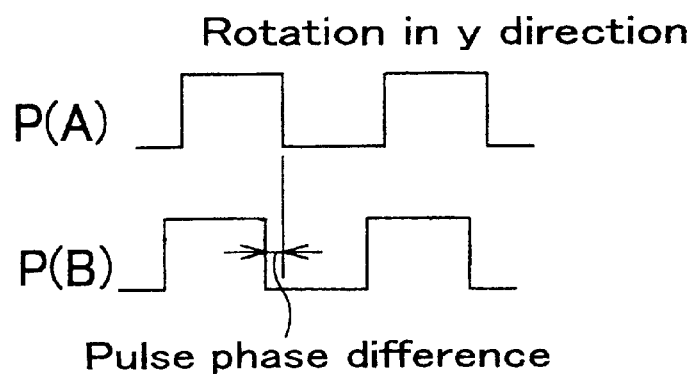

With reference to FIGS. 3A to 3C, a backward movement detection device BKD for detecting or determining backward displacement of the vehicle will be described.

The backward movement detection device BKD in this embodiment utilizes a phase difference of teeth of helical gears. The helical gears HG(A) and HG(B) are provided downstream of the starting clutch of CVT 3. The helical gears HG(A), HG(B) may be provided at any positions as long as they are rotatable with the tires. As shown in FIG. 3A, gear teeth of the helical gears HG(A), HG(B) are positioned in helical and diagonal relation around the periphery of the gear. The phase of the gear teeth shifts with the rotation of the helical gears HG(A), HG(B) in x and y directions. To this end, electromagnetic pick-ups P(A), P(B) are provided on the respective helical gears HG(A), HG(B) to align in the same axis AX of the helical gears. The electromagnetic pickups P(A), P(B) detect the front ends of the gear teeth. The direction of the rotation is obtained from the pulse phase difference based on the two pulses detected at the electromagnetic pick-ups P(A), P(B).

As best seen in FIG. 3B, when the helical gears HG(A), HG(B) rotate to the x direction, the pulse detected at the electromagnetic pick-up P(B) shifts back from that detected at the electromagnetic pick-up P(A). In other words, the front ends of the gear teeth of the helical gear HG(A) are detected before those of the gear teeth of the helical gear HG(B). Meanwhile, when the helical gears HG(A), HG(B) rotate to the y direction, the pulse detected at the electromagnetic pick-up P(B) shifts forward to that detected at the electromagnetic pick-up P(A) (FIG. 3C). In other words, the front ends of the gear teeth of the helical gear HG(A) are detected after those of the gear teeth of the helical gear HG(B).

The direction of the rotation is therefore detected by the pulse phase difference. Rotation in the y direction indicates backward displacement of the vehicle. Backward displacement is detected by the relative positions of the two pulses obtained from the electromagnetic pick-ups P(A), P(B) mentioned above. As long as there is a phase difference, any known gears other than helical gears HG(A), HG(B) may be employed.

The backward movement detection device BKD also has a function as a vehicle speed sensor. For this reason, the whole arrangement becomes compact and cheap.

Signals

With reference to FIG. 1, signals to be transmitted and received in this system of the vehicle will be described.

As seen in FIG. 1, the letter "F_" in front of each signal indicates that the signal is flag information, which is either a 0 or 1. The letter "V_" indicates that the signal is numerical information (unit is optional), and the letter "I_38 indicates that the signal includes different kinds of information.

Signals transmitted from FI/MG ECU 4 to CVT ECU 6 will be described. V_MOTTRQ represents an output torque value of motor 2. F_MGSTB is a flag showing whether all of the engine stop conditions determined at FI/MG ECU 4 are satisfied. If all the conditions are satisfied, a 1 is provided, and if not, 0 is provided. The automatic engine stop conditions regarding F_MGSTB will be described later. When F_MGSTB and F_CVTOK (hereinafter described) are both set to 1, engine 1 is automatically stopped. When one of these flags is set to 0, engine 1 is automatically actuated.

A signal transmitted from FI/MG ECU 4 to CVT ECU 6 and MOT ECU 5 will be described. V_NEP represents engine speed.

Signals transmitted from CVT ECU 6 to FI/MG ECU 4 will be described. F_CVTOK is a flag indicating whether all of the engine stop conditions determined at CVT ECU 6 are satisfied. If all the conditions are satisfied, a 1 is provided, and if not, a 0 is provided. The automatic engine stop conditions regarding F_CVTOK will be described later. F_CVTTO is a flag indicating whether the oil temperature of CVT 3 is greater than a certain value. If the oil temperature is equal to or greater than the certain value, a 1 is provided, and if the oil temperature is less than the value, a 0 is provided. The oil temperature of CVT 3 is obtained from an electrical resistance value of the linear solenoid valve controlling the hydraulic pressure of the starting clutch at CVT 3. F_POSR is a flag indicating whether the positioning switch PSW is set in the R range. If the positioning switch PSW is set in the R range, a 1 is provided, and if not, a 0 is provided. F_POSDD is a flag indicating whether the positioning switch PSW is set in the D range and the mode switch MSW is set in the D mode. If the D range and D mode (D range/D mode) are selected, a 1 is provided, and if not, a 0 is provided. When FI/MG ECU 4 does not receive any information indicating the D range/D mode, R range, P range or N range, FI/MG ECU 4 determines that either the D range/S mode or L range is selected.

F_MCRPON is a flag indicating whether or not the driving force is in the middle creep condition. A 1 is provided in the middle creep condition, and if not, a 0 is provided. When F_MCRPON is 1, engine 1 is required to blow middle air in the middle creep condition (weaker air than that in the strong creep condition). F_AIRSCRP is a strong air demand flag in the strong creep condition. If strong air is required in the strong creep condition, a 1 is provided, and if not, a 0 is given. When both F_MCRPON and F_AIRSCRP are 0, FI/MG ECU 4 blows weak air in the weak creep condition. In order to keep the engine idle speed at a certain level regardless of the driving force in the strong creep condition, middle creep condition or the weak creep condition, the engine output should be adjusted by blowing air corresponding to the strong creep condition, middle creep condition or the weak creep condition. When the driving force is in the strong creep condition and the load of engine 1 is higher, a strong air blow (strong air in the strong creep condition) is required. The term "air blow" means the supply of air from an air passage bypassing a throttle valve in engine 1 to an intake pipe positioned downstream from the throttle valve. Air flow is adjusted by controlling the degree of the opening of the air passage.

Signals transmitted from engine 1 to FI/MG ECU 4 and CVT ECU 6 will be described. V_ANP represents a negative pressure value at the intake pipe of engine 1. V_TH represents a throttle angle. V_TW represents a temperature of the cooling water at engine 1. V_TA represents the intake temperature of engine 1. The brake fluid temperature in the brake fluid pressure retaining apparatus RU disposed within the engine compartment is obtained from the intake temperature. This is because both temperatures change with respect to the temperature at the engine compartment.

A signal transmitted from CVT 3 to FI/MG ECU 4 and CVT ECU 6 will be described. V_VSP1 represents a vehicle speed pulse from one of two vehicle speed pickups provided in CVT 3. Vehicle speed is calculated based on this vehicle speed pulse.

Signals transmitted from CVT 3 to CVT ECU 6 will be described. V_NDRP represents a pulse showing the number of revolutions of the drive pulley provided at CVT 3. V_NDNP represents a pulse showing the number of revolutions of the driven pulley provided at CVT 3. V_VSP2 represents a vehicle speed pulse from the other vehicle speed pickup at CVT 3. V_VSP2 is more accurate than V_VSP1, and V_VSP2 is used for calculating the amount of clutch slipping at CVT 3. F_BK represents a backward displacement flag (backward displacement signal) showing a result that backward displacement of the vehicle is detected. If backward displacement of the vehicle is detected, a 1 is provided, and if not, a 0 is provided. The backward displacement of the vehicle may be detected at CVT ECU 6 after the phase difference signal is transmitted to CVT ECU 6.

Signals transmitted from MOT ECU 5 to FI/MG ECU 4 will be described. V_QBAT represents the remaining capacity of the battery. V_ACTTRQ represents an output torque value of motor 2, which is the same as V_MOTTRQ. I_MOT represents information such as the amount of generated energy of motor 2 showing electric loading. Motor 2 generates all the electric power consumed for the vehicle, including the electric power for driving the motor.

Signals transmitted from FI/MG ECU 4 to MOT ECU 5 will be described. V_CMDPWR represents an output required value to motor 2. V_ENGTRQ represents an output torque value of engine 1. I_MG represents information such as an actuation mode, assist mode and a regeneration mode with respect to motor 2.

A signal transmitted from the master power MP to FI/MG ECU 4 will be described. V_M/PNP represents a negative pressure detected value at a constant pressure chamber of the master power MP.

A signal transmitted from the positioning switch PSW to FI/MG ECU 4 will be described. An N or P is transmitted as positioning information when the positioning switch PSW selects either the N or P range.

Signals transmitted from CVT ECU 6 to CVT 3 will be described. V_DRHP represents a hydraulic pressure command value transmitted to the linear solenoid valve, which controls hydraulic pressure within the cylinder of the drive pulley at CVT 3. V_DNHP represents a hydraulic pressure command value transmitted to the linear solenoid valve, which controls hydraulic pressure within the cylinder of the driven pulley at CVT 3. The transmission gear ratio of CVT 3 is changed by V_DRHP and V_DNHP. V_SCHP represents a hydraulic pressure command value transmitted to the linear solenoid valve, which controls the hydraulic pressure of the starting clutch at CVT 3. The engaging force of the starting clutch (driving force transmission capacity) is changed by V_SCHP.

Signals transmitted from CVT ECU 6 to the brake fluid pressure retaining apparatus RU will be described. F_SOLA is a flag for the ON/OFF (shut-off position or close/communicating position or open) of the solenoid valve SV(A) of the brake fluid pressure retaining apparatus RU (shown in FIG. 2). A 1 is provided for closing (ON) the solenoid valve SV(A), and a 0 is provided for opening (OFF) the solenoid valve SV(A). Likewise, F_SOLB is a flag for the ON/OFF (shut-off position or close/communicating position or open) of the solenoid valve SV(B) of the brake fluid pressure retaining apparatus RU (shown in FIG. 2). A 1 is provided for closing (ON) the solenoid valve SV(B), and a 0 is provided for opening (OFF) the solenoid valve SV(B).

A signal transmitted from the positioning switch PSW to CVT ECU 6 will be described. The positioning switch PSW selects the N, P, R, D or L range, and the selected range is transmitted as positioning information.

A signal transmitted from the mode switch MSW to CVT ECU 6 will be described. The mode switch MSW selects either the D (normal running mode) or S mode (sports running mode), and the selected mode is transmitted as mode information. The mode switch MSW is a mode selection switch, which works when the positioning switch PSW is set in the D range.

A signal transmitted from the brake switch BSW to FI/MG ECU 4 and CVT ECU 6 will be described. F_BKSW is a flag showing whether the brake pedal BP is depressed (ON) or released (OFF). If the brake pedal BP is depressed, a 1 is provided, and if the brake pedal is released, a 0 is provided.

Signals transmitted from CVT ECU 6 to meter 10 will be described. The positioning switch PSW selects the N, P, R, D or L range, and the selected range is transmitted as positioning information. Further, the mode switch MSW selects either the D (normal running mode) or S mode (sports running mode), and the selected mode is transmitted as mode information.

Brake Fluid Pressure Retaining Apparatus

With reference to FIGS. 2 and 4, the constitution of the brake fluid pressure retaining apparatus RU will be described, together with a hydraulically operable braking device BK.

The brake fluid pressure retaining apparatus RU in this embodiment is incorporated within the brake fluid pressure circuits BC of a hydraulically operable braking device BK. The brake fluid pressure retaining apparatus RU comprises a brake fluid pressure reduction speed control means which retains reduction speed of the brake fluid pressure within the wheel cylinder less than that of brake pedal load applied by the driver.

In the following descriptions, in the case that pluralities of elements or parts are provided with regard to the hydraulically operable braking device BK, such as brake fluid pressure passages FP and solenoid valves SV, a referential character such as (A) or (B) is put after each referential numeral when referring to a particular single element or part. Meanwhile, no such referential character is put after a referential numeral when referring to an overall constitution.

Hydraulically Operable Braking Device

As shown in FIG. 2, the brake fluid pressure circuit BC of the hydraulically operable braking device BK comprises the brake fluid pressure passage FP connecting the braking device BK to the master cylinder MC and the wheel cylinder WC. Because braking is a very important safety factor, the braking device BK has two separate systems of brake fluid pressure circuits BC(A), BC(B). Therefore, if one system is out of order, the remaining system obtains a minimum braking force.

A master cylinder piston MCP is inserted into a main body of the master cylinder MC. When the driver applies a load to the brake pedal BP, the piston MCP is pressed and pressure is applied to the brake fluid within the master cylinder MC so that mechanical force is converted into brake fluid pressure. When the driver releases the brake pedal BP by removing the applied load, the piston MCP is returned to the original position by the resilient action of a return spring MCS and brake fluid pressure is released. In order to have a fail-safe mechanism, two separate brake fluid pressure circuits BC are provided. For this reason, the master cylinder MC shown in FIG. 2 is a tandem master cylinder, where two pistons MCP are connected in series so that the main body of the master cylinder MC is divided into two portions.

A master power MP (brake booster) is provided between the brake pedal BP and the master cylinder MC to ease the braking effort of the driver. The master power MP shown in FIG. 2 is a vacuum servo type. The master power MP removes negative pressure from an intake manifold of engine 1 (FIG. 1) to facilitate the braking operation of the driver.

The brake fluid pressure passage FP connects the master cylinder MC and the wheel cylinders WC. The brake fluid pressure passage BC functions as a fluid channel. Brake fluid pressure generated at the master cylinder MC is transmitted to the wheel cylinders WC because the flow of the brake fluid travels through the brake fluid pressure passage BC. When the brake fluid pressure within the wheel cylinders WC is greater, the brake fluid is transmitted from the wheel cylinders WC to the master cylinder MC through the brake fluid pressure passage BC. Because separate brake fluid pressure circuits BC are provided for the reason mentioned above, two separate brake fluid passage systems FP are also provided. The brake fluid pressure circuit BC, such as constructed by the brake fluid passage shown in FIG. 2, is an X-piping type, where one brake fluid pressure circuit BC(A) is for braking a front right wheel and a rear left wheel, and the other brake fluid pressure circuit BC(B) is for braking a front left wheel and a rear right wheel. The brake fluid pressure circuit may be a front and rear dividing piping type, where one brake fluid pressure circuit is for braking the front wheels, and the other brake fluid pressure circuit is for braking the rear wheels.

The wheel cylinder WC is provided for each wheel so that brake fluid pressure generated at the master cylinder MC and transmitted to the wheel cylinders WC through the brake fluid pressure passage FP is converted into a mechanical force (braking force) for braking wheels. A piston is inserted into the wheel cylinder WC so that when the piston is pressed by the brake fluid pressure, it generates a braking force for actuating brake pads in disc brakes or brake shoes in drum brakes.

Additionally, brake fluid pressure control valves for controlling the brake fluid pressure within the wheel cylinders of the front and rear wheels may be provided.

Brake Fluid Pressure Retaining Apparatus

As shown in FIG. 2, the brake fluid pressure retaining apparatus RU comprises a brake fluid pressure reduction speed control means which, upon starting the vehicle, retains reduction speed of the brake fluid pressure within the wheel cylinder WC less than that of brake pedal load applied by the driver. The brake fluid pressure retaining apparatus RU has a function for retaining reduction speed of the brake fluid pressure within the wheel cylinder WC (reduction speed of the braking force) less than that of brake pedal load applied by the driver when the driver releases the brake pedal BP at a restart of the vehicle.

Such a function can be achieved by providing a flow resistance against a flow of brake fluid within the brake fluid pressure circuit BC, so as to restrict the flow of brake fluid per se.

In order to restrict a flow of brake fluid, the brake fluid pressure circuit BC comprises a solenoid valve SV and a restriction D, and if necessary, a check valve CV and a relief valve RV. A solenoid valve SV and a restriction D constitute the brake fluid pressure reduction speed control means. The brake fluid pressure circuit BC connects the master cylinder MC and the wheel cylinder WC, and it is provided with a fluid pressure passage MNP to be communicated or shut off by the action of the solenoid valve SV. Further, a bypass passage BYP is provided. The bypass passage BYP bypasses the solenoid valve SV, and it always connects the master cylinder MC and the wheel cylinder WC. The restriction D is provided within the bypass passage BYP for restricting a flow rate of the brake fluid, i.e. a flow of the brake fluid per se. Therefore, even if the solenoid valve SV is in a shut-off position, the restriction within the bypass passage BYP connects the master cylinder MC and the wheel cylinder WC in a flow restriction manner.

The solenoid valve SV is actuated by an electric signal from the control unit CU. The solenoid valve SV is switched between the communicating position and the shut-off position. The solenoid valve SV shuts off a flow of brake fluid within the brake fluid pressure passage FP in its shut-off position to retain the brake fluid pressure applied to the wheel cylinder WC. The solenoid valves SV(A), SV(B) shown in FIG. 2 are both in the communicating position. The solenoid valve SV prevents the vehicle from undesirably rolling down a slope when the vehicle starts on a slope. This is because when the driver releases the brake pedal BP, brake fluid pressure is retained within the wheel cylinder WC. The terms "backward displacement" or "rolling down a slope" indicate that the vehicle moves in an opposite direction due to its own weight (potential energy), in other words, the vehicle begins to descend backwards on a slope.

The solenoid valve SV may be one of normally open and normally closed types. However, in order to have a fail-safe mechanism, a normally open type is preferable. This is because when electricity is cut off due to a malfunction, the brake does not work or the brake always works in a normally closed type solenoid valve SV. (In this embodiment, the normally open type solenoid valves are used.) In the normal operation, the solenoid valve SV is shut off when the vehicle stops, and is kept in the shut-off position until the vehicle starts to move. Conditions for switching the solenoid valve SV to the shut-off position or to the communicating position will be described later.

A restriction D always connects the master cylinder MC and the wheel cylinders WC regardless of the conditions of the solenoid valve SV such as ON (communicating position) or OFF (shut-off position). When the solenoid valve SV is in the shut-off position and the driver gradually or instantly releases the brake pedal BP, the restriction D reduces brake fluid pressure within the wheel cylinder WC at a certain speed by gradually transferring brake fluid from the wheel cylinder WC to the master cylinder MC. A restriction D may be formed by providing a flow control valve in the brake fluid passage FP. Alternatively, the restriction D may be formed at a part of the brake fluid passage FP by way of flow resistance (reduced area portion of the passage, at which a part of the section becomes narrow).

When the restriction D is provided, if the driver gradually or instantly releases the brake pedal BP, the braking force is gradually lowered so that even if the solenoid valve SV is in the shut-off position, the brake does not work permanently. In other words, the reduction speed of the brake fluid pressure within the wheel cylinder is less than that of brake pedal load applied by the driver. Therefore, even if the solenoid valve SV is in the shut-off position, the braking force is reduced after a certain period of time so that the vehicle can start to move on an up slope by the driving force of the driving motor. Meanwhile, the vehicle can start off on a down slope due to its own weight without requiring the accelerator pedal operation of the driver.

The restriction D does not affect the braking force as long as the brake fluid pressure within the master cylinder MC due to the driver's brake pedal operation is greater than that within the wheel cylinder WC. This is because brake fluid flows based on a pressure difference between the wheel cylinder WC and the master cylinder MC, i.e. from one at a higher brake fluid pressure to the other at a lower brake fluid pressure. Unless the driver releases the brake pedal BP, the brake fluid pressure within the wheel cylinder WC does not decrease although it may increase. The restriction D may function as a check valve to prevent a counter flow from the master cylinder MC to the wheel cylinder WC.

Reduction speed of the brake fluid pressure within the wheel cylinder WC is determined to prevent the vehicle from undesirably rolling down a slope during the time that the driver releases the brake pedal BP and then depresses the accelerator pedal and that the driving motor increases the driving force sufficiently to start the vehicle on the slope. Usually 0.5 seconds is required for sufficiently increasing the driving force after the pedal-changing action. If it is possible to prevent the vehicle from rolling down a slope during this interval, the driver can smoothly start the vehicle on the slope. For this reason, the brake fluid pressure reduction speed is determined such that the brake fluid pressure can be retained longer than 0.5 seconds. Reduction speed for reducing brake fluid pressure within the wheel cylinder WC can be changed by properties of the brake fluid or the shape of the restriction D (cross section or length of the flow passage).

The restriction D may be employed as an integral member with a solenoid valve SV and a check valve CV. In this case, the number of parts and installation space may be reduced.

A check valve CV is provided as necessary. The check valve CV transfers the brake fluid pressure generated within the master cylinder MC into the wheel cylinders WC when the solenoid valve SV is closed and the driver increases the brake pedal load. The check valve CV works effectively when the brake fluid pressure generated within the master cylinder MC is greater than that within the wheel cylinder WC. The check valve CV quickly increases brake fluid pressure within the wheel cylinder WC in accordance with the increased brake pedal load. If an arrangement is employed such that the solenoid valve SV is switched from the shut-off position to the communicating position when the brake fluid pressure within the master cylinder MC becomes greater than that within the wheel cylinders WC, there is no need to provide a check valve CV because the solenoid valve SV itself responds to the increased brake pedal load.

A relief valve RV is also provided as necessary. The relief valve RV transfers brake fluid within the wheel cylinder WC into the master cylinder MC until the brake fluid pressure within the wheel cylinder becomes a certain pressure level (relief pressure) when the solenoid valve SV is in the shut-off position and the driver gradually or instantly releases the brake pedal BP. The relief valve RV works when the brake fluid pressure within the wheel cylinder WC is greater than the predetermined brake fluid pressure and the brake fluid pressure within the master cylinder MC. Therefore, even if the solenoid valve SV is in the shut-off position, extra brake fluid pressure within the wheel cylinder WC, beyond the necessary brake fluid pressure, is quickly reduced to the relief pressure. This can eliminate the drawback that unnecessary time is required for reducing the brake fluid pressure within the wheel cylinder WC if the driver forcefully depresses the brake pedal BP more than required and if the reduction of the brake fluid pressure is carried out merely through the restriction D. Further, because the release of the brake fluid pressure can be started from the relief pressure, the relief time of the brake fluid pressure through the restriction D becomes substantially constant, thereby leading to an improved stability of the control as the brake fluid pressure retaining apparatus RU.

Control Unit

Control unit CU included in CVT ECU 6 comprises CPU (not shown), memory, input/output interface, bus, and the like, and controls the brake fluid pressure retaining apparatus RU. Various signals, such as F_BKSW from the brake switch BSW, a hydraulic pressure command value V_SCHP to a linear solenoid valve of CVT 3, where the engagement hydraulic pressure of the starting clutch is controlled, a vehicle speed pulse V_VSP1, a backward displacement signal F_BK, a throttle angle signal V_θTH (FIG. 4A), and a signal from the positioning switch PSW are inputted into the control unit CU in order to control ON/OFF of the solenoid valve SV. For this reason, the control unit CU generates flag signals F_SOLA, F_SOLB to turn on and off the solenoid valves SV(A), SV(B), and transmits them to the solenoid valves SV(A), SV(B). The solenoid valve SV(A) is ON (shut-off position) when the flag signal F_SOLA is "1", and OFF (communicating position) when the flag signal F_SOLA is "0". Likewise, the solenoid valve SV(B) is ON (shut-off position) when the flag signal F_SOLB is "1", and OFF (communicating position) when the flag signal F_SOLB is "0". Conditions for turning on and off the solenoid valve SV, viz. the conditions that the brake fluid pressure retaining apparatus RU retains brake fluid pressure and the conditions that the retained brake fluid pressure is released, will be described later.

One example of the control unit CU, which releases the retained brake fluid pressure with the use of a first setting time and a second setting time, will be described with reference to FIG. 4.

Figure 4A:
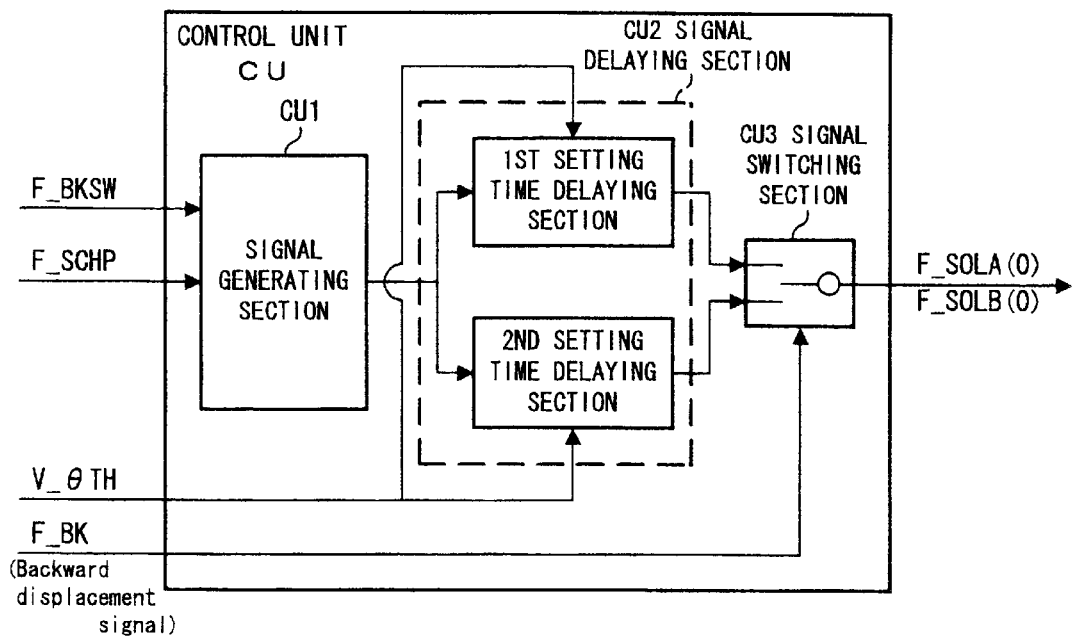
FIG. 4A shows one example of a functional block diagram of the brake fluid pressure retaining apparatus illustrating a part for releasing the retained brake fluid pressure.

The control unit CU shown in FIG. 4A comprises a signal generating section CU1, a signal delaying section CU2, a signal switching section CU3 and the like. The signal generating section CU1 generates signals F_SOLA (0) and F_SOLB (0) for switching the solenoid valve SV from the shut-off position to the communicating position so as to instantly release the retained brake fluid pressure, and then inputs these signals to the subsequent signal delaying section CU2. The signal generating section CU1 inputs the signals F_SOLA (0) and F_SOLB (0) on condition that the release of the brake pedal BP is confirmed by F_BKSW from the brake switch BSW and that the strong creep condition is confirmed by the hydraulic pressure command value V_SCHP from CVT ECU 6.

The flag signals F_SOLA (0) and F_SOLB (0) indicate that 0 is set for the aforementioned flag signals F_SOLA and F_SOLB, respectively.

The flag signals F_SOLA (0) and F_SOLB (0) are inputted into a first setting time delaying section and a second setting time delaying section of the signal delaying section CU2.

The first setting time delaying section delays the signals F_SOLA (0) and F_SOLB (0) for a certain period of time, i.e. a first setting time TM (1 second), and inputs them to the subsequent signal switching section CU3. The throttle angle signal V_θTH is inputted into the first setting time delaying section. The first setting time delaying section outputs the signals F_SOLA (0) and F_SOLB (0) to the subsequent signal switching section CU3 when the depression of the accelerator pedal is detected.

Figure 4B:
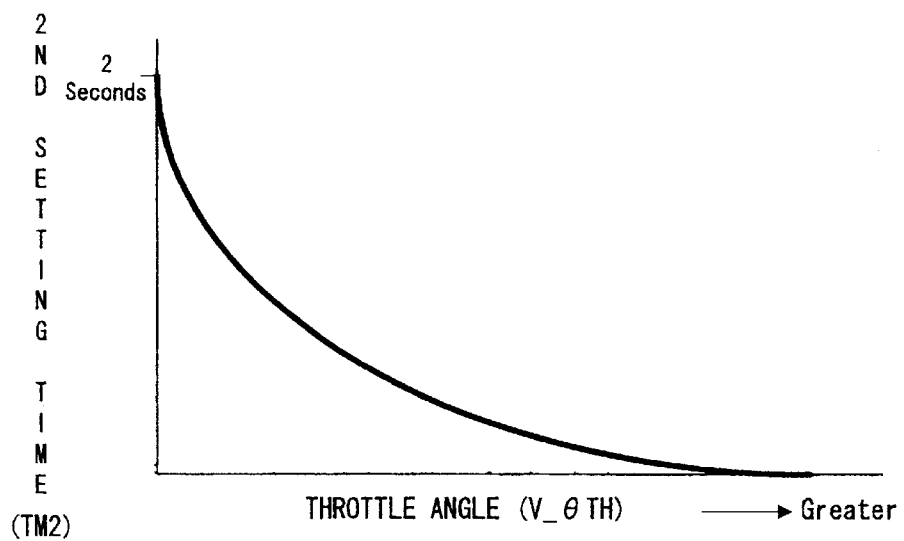
FIG. 4B shows a map for setting a second setting time.

Meanwhile, second setting time delaying section delays the signals F_SOLA (0) and F SOLB (0) for a certain period of time, i.e. a second setting time TM2 (2 seconds at the maximum) to be set based on the throttle angle, and inputs them to the subsequent signal switching section CU3. For this reason, the throttle angle signal V_θTH is inputted into the second setting time delaying section, and the second setting time delaying section searches a map as shown in FIG. 4B with the use of the inputted signal as an address to set the second setting time TM2. The second setting time TM2 shown in this figure becomes smaller (shorter) between 2 seconds and 0 second as the throttle angle signal V_θTH becomes greater. In other words, the second setting time TM2 becomes shorter as the driver depresses the accelerator pedal forcibly. The map-search is carried out in for example every 10 milliseconds. Every time the map is searched, the second setting time TM2 is updated. Therefore, the second setting time may become shorter after 10 milliseconds for example from 2 seconds to 0.8 seconds and vice versa.

Instead of changing the second setting time TM2, the second setting time TM2 may be constant, such as for example 2 seconds. This can also achieve the purpose for decreasing the backward displacement amount of the vehicle upon rolling down a slope. When the vehicle does not roll down a slope, the retained brake fluid pressure is released after the first setting time TM1 passes. Therefore, even if the second setting time TM2 is fixed at 2 seconds, no problems will arise at a start as long as the vehicle does not displace backwards. Herein, 2 seconds is determined for providing the driver with sufficient time upon the vehicle undesirably rolling down a slope and also in consideration of brake dragging.

In the map shown in FIG. 4B, the second setting time TM2 is changed between 2 seconds and 0 second. However, the second setting time TM2 may be changed between 2 seconds and 1 second. In other words, the minimum value of the second setting time TM2 may be the same as the first setting time TM1. In this instance, it is also possible to decrease the backward displacement amount of the vehicle and brake dragging.

Now turning back to FIG. 4A. The backward displacement signal F_BK is inputted into the subsequent signal switching section CU3. The signal switching section CU3 selects F_SOLA (0) and F_SOLB (0) outputted either from the first setting time delaying section or the second setting time delaying section of the signal delaying section CU2, and then outputs the selected signals to the subsequent solenoid valves SV(A), SV(B). Specifically, when the backward displacement signal F_BK is 0, i.e. the vehicle does not undesirably roll down a slope, the signal switching section CU3 selects the signals F_SOLA (0) and F_SOLB (0) outputted from the first setting time delaying section. Therefore, even if the signals F_SOLA (0) and F_SOLB (0) are outputted from the second setting time delaying section, these signals are not inputted into the solenoid valves SV(A), SV(B). Meanwhile, when the backward displacement signal F_BK is 1, i.e. the vehicle is undesirably rolling down a slope, the signal switching section CU3 selects the signals F_SOLA (0) and F_SOLB (0) outputted from the second setting time delaying section. Therefore, even if the signals F_SOLA (0) and F_SOLB (0) are outputted from the first setting time delaying section, these signals are not inputted into the solenoid valves SV(A), SV(B).

The backward displacement signal F_BK becomes 1 when the vehicle undesirably rolls down a slope. This value is kept until a starting operation is completed.

It should be noted that FIG. 4A merely shows the constitution of the control unit CU for releasing the retained brake fluid pressure with the use of the first setting time TM1 and the second setting time TM2. Therefore, the control unit CU includes various elements, such as for retaining brake fluid pressure, other than the elements shown in FIG. 4A.

Figure 5:
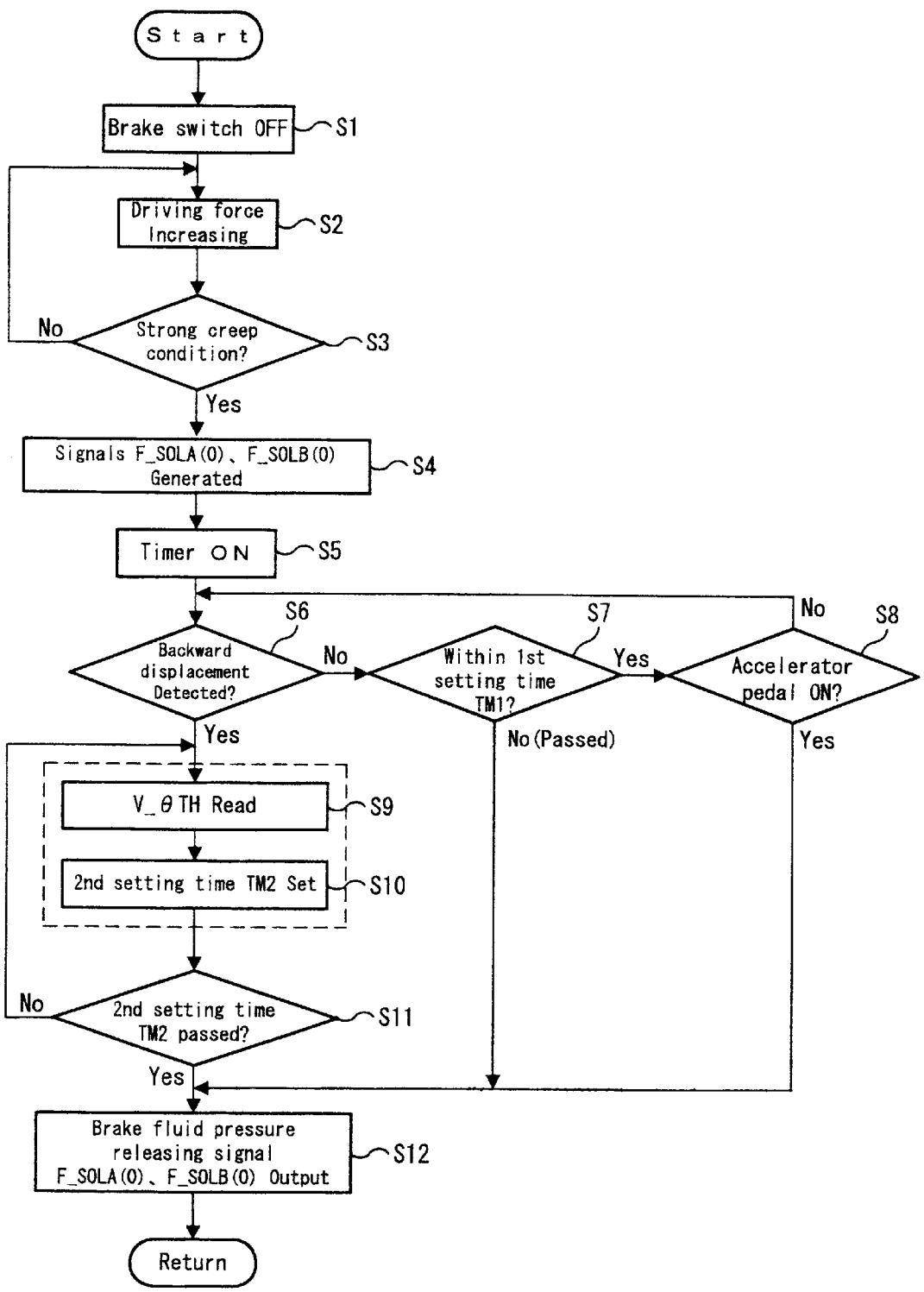
FIG. 5 is a flow chart showing one example of releasing the retained brake fluid pressure with the use of a first setting time and a second setting time.

The manner of operation for releasing the retained brake fluid pressure with the use of the first setting time TM1 and the second setting time TM2 may be illustrated by the flow chart shown in FIG. 5. See FIGS. 1 and 2 for reference.

With reference FIG. 5, operations and determinations in this flow chart will be described.

Firstly, the driver releases the brake pedal BP to start the vehicle. The brake switch BSW is then turned OFF (S1) and the driving force is increased to the strong creep condition (S2, S3). When the strong creep condition is achieved, the signals F_SOLA (0) and F_SOLB (0) are generated for turning OFF (communicating position) the solenoid valves SV(A), SV(B) (S4). The timer is turned ON and actuates (S5).

At step S6, determination is made as to whether the vehicle is undesirably rolling down a slope (backward displacement detection), and if backward displacement is not detected, then proceeding to step S7 to determine whether the fist setting time TM1 has passed. If the first setting time TM1 has not passed, then proceeding to step S8 to determine whether the accelerator pedal is depressed. If the accelerator pedal is not depressed, then proceeding to step S6.

At step S7, if the first setting time TM1 has passed, it is determined that the starting operation was carried out without undesirable backward displacement, and therefore at step S12, the retained brake fluid pressure is released, i.e. F_SOLA (0) and F_SOLB (0) are outputted to the solenoid valves SV(A), SV(B). At step S8, if the accelerator pedal is depressed, the vehicle has not undesirably rolled down at this point of time and the vehicle can start by the driving force raised due to the depression of the accelerator pedal. Therefore, the retained brake fluid pressure is released at step S12. In a case that the vehicle does not displace backwards and the driver does not depress the accelerator pedal, the first setting time, viz. the interval after the timer is ON at step S5 and before the retained brake fluid pressure is released at step S12, is 1 second.

Meanwhile, if backward displacement of the vehicle is determined (backward displacement detected), the throttle angle signal V_θTH is read and the second setting time TM2 is set (step S9 and step S10). The second setting time becomes shorter as the depression amount of the accelerator pedal increases, viz. as the throttle angle signal V_θTH becomes greater. This is because the output of engine 1 is greater as the throttle angle signal V_θTH becomes greater, and therefore it is determined that the backward displacement restriction force has been raised proportionally. Determination is made at step S11 whether the second setting time TM2 has passed. And if the second setting time TM2 has not passed, then proceeding to step S8 to operate the subsequent processes. However, if it is determined at step S11 that the second setting time TM2 has passed, the retained brake fluid pressure is released (S12) because the vehicle can start by the driving force (or the driver has been given a sufficient time). In a case that the vehicle displaces backwards and the driver does not depress the accelerator pedal, the second setting time, viz. the interval after the timer is ON at step S5 and before the retained brake fluid pressure is released at step S12, is 2 second. And during this time, because the braking force continuously acts on the vehicle, the backward displacement amount of the vehicle becomes smaller in comparison with the case when the retained brake fluid pressure is always released at the first setting time TM1. Also, it provides the driver with sufficient time.

Specific Control of Brake Fluid Pressure Retaining Apparatus and Vehicle

With reference to FIGS. 1 to 11, specific control of the brake fluid pressure retaining apparatus RU and the vehicle equipped with the brake fluid pressure retaining apparatus RU will be described.

Conditions for Retaining Brake Fluid Pressure

Conditions for retaining brake fluid pressure will be described.

As shown in FIG. 6A, the brake fluid pressure is retained when all of the following four conditions are satisfied.

I) Brake switch BSW is ON.

II) Driving range is other than Neutral (N range), Parking (P range) and Reverse (R range).

III) Operation of the solenoid valve SV of the brake fluid pressure retaining apparatus RU is permitted.

IV) Vehicle speed is 0 km/h.

When all the above conditions are satisfied, both solenoid valves SV(A), SV(B) are switched to the shut-off position, thereby retaining the brake fluid pressure.

The above four conditions will be described below.

I) Brake switch BSW is ON. This is a condition because no brake fluid pressure or few brake fluid pressure will be retained within the wheel cylinders WC.

II) Driving range is other than Neutral (N range), Parking (P range) and Reverse (R range). This is a condition for canceling unnecessary operation of the brake fluid pressure retaining apparatus RU in the N or R range, and in the R range, for preventing the vehicle from undesirably rolling down a slope with the aid of the driving force in the strong creep condition because the strong creep condition is kept in the R range.

Therefore, the brake fluid pressure is retained while the D (driving range) or L range (low range) is selected.

III) Operation of the solenoid valve SV of the brake fluid pressure retaining apparatus RU is permitted. This condition is for reminding the driver to sufficiently depress the brake pedal BP before retaining the brake fluid pressure, thereby preventing the vehicle from undesirably rolling down a slope. Because sufficient brake fluid pressure (driving force)

is obtained in the strong creep condition so that the vehicle can stand still on a slope at an inclination angle of 5 degrees, the driver often depresses the brake pedal BP insufficiently. In this situation, if the solenoid valve SV is closed and engine 1 is stopped, the vehicle will undesirably displace backwards. Meanwhile, in the weak creep condition and the middle creep condition, the driving force is not sufficient for keeping the vehicle stationary on a slope having an inclination angle of 5 degrees. For this reason, the driving force is weakened in order to urge the driver to forcefully depress the brake pedal BP and in order to obtain sufficient brake fluid pressure to prevent the backward displacement of the vehicle even if the driving force is decreased or lost. The control logic for permitting an operation of the solenoid valve SV of the brake fluid pressure retaining apparatus RU will be described later.

IV) Vehicle speed is 0 km/h. This is a condition because the driver cannot select a position for parking the vehicle if the solenoid valve SV is switched to the shut-off position while the vehicle is running.

Meanwhile, because the vehicle stops when the vehicle speed is 0 km/h, the brake fluid pressure can be retained without causing any trouble in the driving operation. "Vehicle speed of 0 km/h" also includes a condition just before the vehicle stops.

Conditions Required for Permitting Operation of the Brake Fluid Pressure Retaining Apparatus (Solenoid Valve)

With reference to FIG. 6B, conditions required for permitting an operation of the brake fluid pressure retaining apparatus RU (solenoid valve SV) will be described. An operation of the solenoid valve SV is permitted while the driving force is either in the weak creep condition or in the middle creep condition. In the weak creep condition and the middle creep condition, the driving force is not sufficient for keeping the vehicle stationary on a slope having an inclination angle of 5 degrees. Therefore, the driving force is switched to a smaller condition, such as the weak creep condition and the like, before retaining brake fluid pressure. Therefore, the driver is forced to depress the brake pedal BP sufficiently before retaining the brake fluid pressure to obtain sufficient brake fluid pressure or braking force for preventing backward displacement of the vehicle. The driving force in the weak creep condition or in the middle creep condition is determined based on a hydraulic pressure command value to a linear solenoid valve of CVT 3, where the engagement the hydraulic pressure of the starting clutch is controlled.

Conditions Required for Weak Creep Order

Figure 7A:
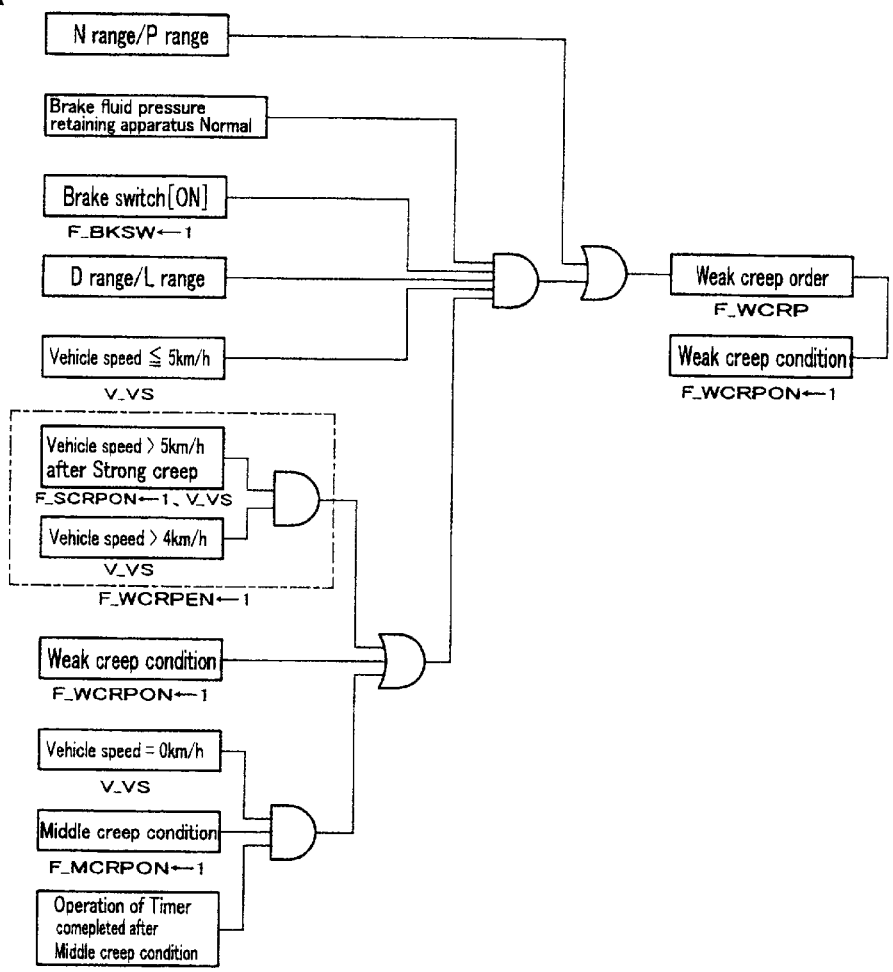

Conditions for transmitting a weak creep order will be described. As shown in FIG. 7A, the weak creep order (F_WCRP) is transmitted when any of the following conditions I) and II) is satisfied. The conditions are:

I) Transmission is set in the N or P range

II) The following two conditions are both satisfied:
    a. (1) Brake fluid pressure retaining apparatus RU is normal;
    (2) Brake switch BSW is ON;
    (3) Positioning switch PSW selects an advance range (D range/L range); and
    (4) Vehicle speed is at 5 km/h or lower; and
    B. (5) Vehicle speed after switching to the strong creep condition >5 km/h and vehicle speed >4 km/h; or
    (6) Driving force is in the weak creep condition; or
    (7) Vehicle speed is 0 km/h, Driving force is in the middle creep condition, and a certain time has passed after switching to the middle creep condition.

When one of the above conditions I) and II) is satisfied, the weak creep order is transmitted and the driving force is switched to the weak creep condition. The above conditions are determined at the driving force control unit DCU. The reason for switching the driving force to the weak creep condition is to improve the vehicle's fuel consumption. When on a slope, it is for reminding the driver to forcefully depress the brake pedal BP to prevent backward displacement of the vehicle while the vehicle stops on the slope.

The conditions for transmitting the weak creep order will be described.

I) Transmission is set in the N or P range. This is a condition because if the transmission is selected from a non-driving range (N/P range) to a driving range (D/L/R range) and at the same time the accelerator pedal is quickly depressed, the driving force transmission capacity of the starting clutch can be instantly increased, allowing a smooth starting operation of the vehicle. In the weak creep condition, because pressure oil has been filled in an oil pressure chamber of the starting clutch, there is no clearance or play for the advance stroke of the piston enforcing the clutch. Therefore, the driving force transmission capacity is instantly increased by increasing the pressure value of the pressure oil.

Driving force is switched to the weak creep condition when the transmission is switched to the N or P range. This is for previously changing the driving force transmission capacity of the starting clutch to the capacity at the weak creep condition. However, the driving force from engine 1 is not transmitted to driving wheels 8. This is distinguished from the weak creep condition while the transmission is set in the D/L range. In the N/P range, the connection between engine 1 and driving wheels 8 is completely cut by a forward/reverse movement switching mechanism arranged in series with the starting clutch on a driving force transmission path. Because neither a transmission path for the forward movement nor a transmission path for the reverse movement is provided in the N/P range, the driving force from engine 1 is not transmitted to driving wheels 8.

II) Conditions (1) to (4) are basic requirements for switching to the weak creep condition. Conditions (5) to (7) indicate the conditions of the vehicle before switching to the weak creep condition.

(1) Brake fluid pressure retaining apparatus RU is normal. This is a condition because the brake fluid pressure (braking force) is not retained if the brake fluid pressure retaining apparatus RU is out of order. Because sufficient driving force is not obtained in the weak creep condition, the vehicle will displace backwards on a slope. If the weak creep order is transmitted and driving force is switched to the weak creep condition regardless of abnormal conditions of the vehicle, e.g., one of the solenoid valves SV(A), SV(B) is not switched to the shut-off position, brake fluid pressure is not retained within the wheel cylinders WC in one false system (braking force is not retained) when the brake pedal BP is released. Therefore, if the driver releases the brake pedal BP when starting on the slope, sufficient brake fluid pressure is not retained and the vehicle undesirably rolls down the slope. Therefore, smooth starting operation without unintentional backward displacement of the vehicle is achieved by the strong creep condition.

(2) Brake switch BSW is ON-. This is a condition because the driver does not intend to reduce the driving force.

(3) Positioning switch PSW selects an advance range (D/L range). This is a condition for improving the vehicle's fuel consumption while an advance range is selected. When the positioning switch PSW selects the D range, the driving force is switched to the weak creep condition, notwithstanding the position (D mode/S mode) of the mode switch MSW. However, in the R range, the driving force is not switched to the weak creep condition. This is for facilitating the steering operation of the vehicle at a garage with the vehicle kept in the strong creep condition.

(4) The vehicle speed is at 5 km/h or lower. This is a condition because the driving force of the driving wheels 8 is transmitted to engine 1 or motor 2 through the starting clutch of CVT 3 to obtain engine brake or carry out regenerative power generation by motor 2.

(5) Vehicle speed after switching to the strong creep condition >5 km/h and Vehicle speed >4 km/h. This is a condition because switching to the weak creep condition is carried out solely by deceleration due to continued brake application. Because the difference of the driving force is greater between the strong creep condition and the weak creep condition, the driver may experience undesirable strong deceleration if the driving force is switched from the strong creep condition to the weak creep condition when the brake pedal BP is depressed. Also, the vehicle may momentarily displace backwards if the vehicle stops on a slope. In such a circumstance, it is preferable not to carry out the switching operation from the strong creep condition to the weak creep condition. Therefore, once switched to the strong creep condition, the driving force is not changed to the weak creep condition until the throttle is OFF (depression of the accelerator pedal is released) over the vehicle speed of 5 km/h and the driving force is switched to the strong creep condition for driving.

The vehicle speed may decrease to 5 km/h, after being switched to the strong creep condition, without depressing the brake pedal BP even if the vehicle has sped up once over 5 km/h and then the driving force is decreased (strong creep condition for driving). For example, when the vehicle moves on an up slope, the vehicle speed may decrease without depressing the brake pedal BP. In that case, because the brake switch BSW is OFF, the driving force is switched to the strong creep condition when the vehicle speed decreases to 5 km/h. In order to cancel a successive switching operation from the strong creep condition to the weak creep condition, a further condition, i.e., vehicle speed >4 km/h is required. The switching operation to the weak creep condition is not carried out unless the brake pedal BP is depressed when the vehicle speed again decreases to 5 km/h. If the brake pedal BP is depressed (brake switch BSW [ON]) when the vehicle speed again decreases to 5 Km/h, the driving force is switched from the strong creep condition for driving to the weak creep condition. In other words, if driving force is not changed to the weak creep condition when the vehicle speed again decreases to 5 km/h (vehicle speed=5 km/h), the strong creep condition is retained as long as the vehicle speed is at or below 5 km/h.

(6) Driving force is in the weak creep condition. This is a condition because once switched to the weak creep condition, the weak creep condition is retained regardless of conditions (5) and (7). According to condition (5), the driving force is switched to the weak creep condition when the vehicle speed becomes 5 km/h. However, if the vehicle speed is less than 5 km/h, condition (5) is not satisfied. The weak creep condition is not retained solely by condition (5) if the vehicle speed is under 5 km/h. As a result, "the driving force is in the weak creep condition" is required to retain the weak creep condition when the vehicle speed under 5 km/h.

(7) Vehicle speed is 0 km/h, driving force is in the middle creep condition, and a certain time has passed after switching to the middle creep condition. This is a condition because deteriorated fuel consumption and vehicle body vibration, while the vehicle stops in the strong creep condition, are prevented with the driving force switched to the weak creep condition. The strong creep condition is retained if the driving force is not changed to the weak creep condition when the vehicle speed again decreases to 5 km/h (vehicle speed=5 km/h) (based on condition (5)), or if the vehicle speed at or below 5 km/h is retained after switching to the strong creep condition by way of releasing the brake pedal BP while being in the weak creep condition. However, if the vehicle stops in the strong creep condition with the brake pedal depressed, fuel consumption deteriorates and vehicle vibration remains. For this reason, when the vehicle stops completely (vehicle speed=0 km/h), the driving force is switched to the middle creep condition, in which driving force is between the strong creep condition and the weak creep conditions and thereafter, if a certain time has passed (300 msec in this embodiment), the driving force is further switched to the weak creep condition. Because the braking force due to depressing the brake pedal BP increases while the driving force is stepwise reduced from the strong creep condition to the middle creep condition and further to the weak creep condition, the momentary displacement of the vehicle on an up slope is made as small as possible.

Conditions Required for Strong Creep Condition for Driving

Figure 7B:
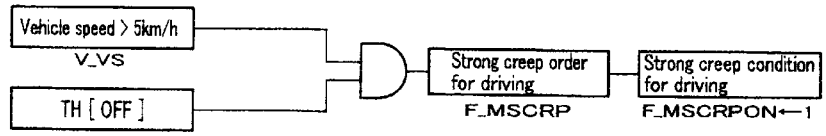

Conditions required for strong creep condition for driving will be described. A strong creep order for driving (F_MSCRP) is transmitted when both of the following two conditions I) and II) are satisfied (FIG. 7B). The creep diving force is switched to the strong creep condition for driving after the strong creep order for driving is transmitted.

I) Vehicle speed >5 km/h.

II) Depression of the accelerator pedal is released (viz. TH [OFF]).

These conditions are determined at the driving force control unit DCU. One reason for switching the driving force to the strong creep condition for driving is to prevent a strong deceleration of the vehicle before stopping due to the switching operation from the strong creep condition to the weak creep condition. Another reason is to prevent momentary backward displacement of the vehicle on an up slope while the vehicle stops. The driving force is switched to the strong creep condition for driving, which is weaker than the strong creep condition, in advance of switching to the weak creep condition.

Each of the above conditions will be described.

I) Vehicle speed >5 km/h. This is a condition because the switching operation from the strong creep condition to the weak creep condition is carried out when the vehicle speed is once over 5 km/h after the strong creep condition and then the vehicle speed becomes 5 km/h. This is also for discriminating between the strong creep condition at a vehicle speed of 5 km/h or lower and the strong creep condition for driving over the vehicle speed of 5 km/h.

II) Depression of the accelerator pedal is released (TH OFF). This is a condition because the driver does not intend a further increment of the driving force, the driving force may be decreased without any problems.

Conditions Required for Middle Creep Condition

Figure 7C:
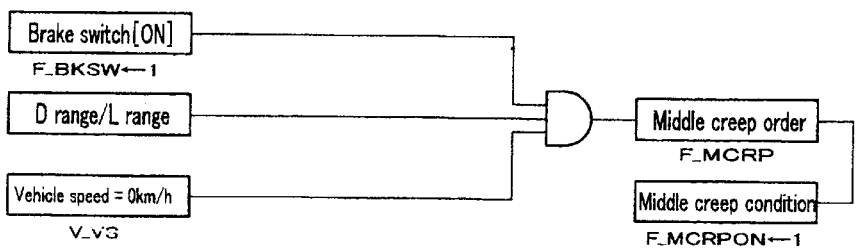

Conditions required for the middle creep condition will be described. As shown in FIG. 7C, when the following three conditions I), II) and III) are satisfied, a middle creep order (F_MCRP) is transmitted.

I) Brake switch BSW is ON.

II) Positioning switch PSW selects an advance range (D/L range).

III) Vehicle is stopped (vehicle speed=0 km/h).

These conditions are determined at the driving force control unit DCU. The strong creep condition is retained if the driving force is not changed to the weak creep condition when the vehicle speed decreases again to 5 km/h (vehicle speed=5 km/h) or if the vehicle speed at 5 km/h or lower is retained after switching to the strong creep condition by releasing the brake pedal BP while being in the weak creep condition. However, if the vehicle continues to stop in the strong creep condition, fuel consumption deteriorates and vehicle vibration continues. For this reason, the middle creep condition is required. As previously mentioned, in order to prevent momentary backward displacement of the vehicle, which is due to switching from the strong creep condition to the weak creep condition while the vehicle stops, the driving force is switched to the middle creep condition.

The above conditions required for the middle creep order will be described.

I) Brake switch BSW is ON. This is a condition because the driver does not intend to reduce the driving force when the brake pedal BP is not depressed.

II) Positioning switch PSW selects an advance range (D/L range). This is a condition for switching to the middle creep condition while an advance range is selected because the driving force is switched to the weak creep condition while the positioning switch is set to the D or L range. Switching to the middle creep condition is not necessary in the N/P range because the weak creep condition is selected as soon as the transmission is switched. Also, switching to the middle creep condition is not necessary in the R range because the strong creep condition is retained in the R range.

III) Vehicle is stopped (vehicle speed=0 km/h). This is a condition because the driving force is switched to the weak creep condition in order to prevent deteriorated fuel consumption and vehicle vibration while the vehicle stops in the strong creep condition. The middle creep condition is required as a transitional condition to the weak creep condition.

A determination of whether or not the driving force is in the weak creep condition, strong creep condition for driving or the middle creep condition, is made based on the hydraulic pressure command value to the starting clutch of CVT 3.

Conditions for Automatically Stopping the Engine

For the purpose of further improving fuel consumption, engine 1 is automatically stopped while the vehicle stops. Conditions for automatically stopping engine 1 will be described.

Figure 8:
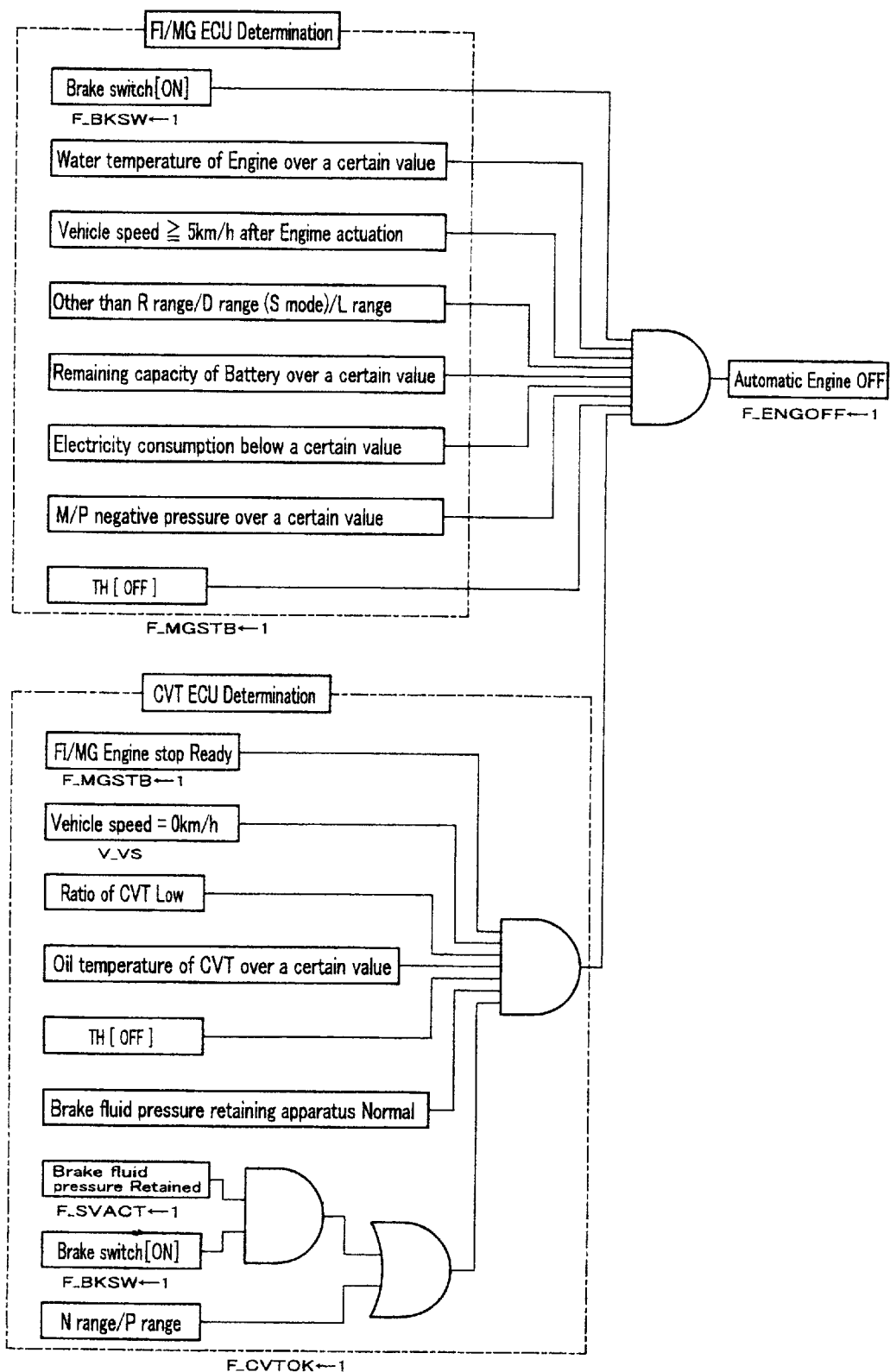
FIG. 8 shows the control logic of a driving motor stopping unit, in which the engine is automatically stopped.

When all the conditions shown in FIG. 8 are satisfied, an engine stop order (F_ENGOFF) is transmitted and engine 1 is automatically stopped. The automatic engine stop operation of engine 1 is carried out by the driving motor stopping unit. Therefore, the following automatic engine stop conditions are determined at the driving motor stopping unit. Specifically, the automatic engine stop conditions are determined at FI/MG ECU 4 and CVT ECU 6. When FI/MG ECU 4 determines that all the following conditions I) to VIII) are satisfied, F_MGSTB becomes 1. When CVT ECU 6 determines that all the following conditions IX) to XV) are satisfied, F_CVTOK becomes 1.

Each of the automatic engine stop conditions will be described.

I) Brake switch BSW is ON. This is a condition for warning the driver. The driver places his foot on the brake pedal BP when the brake switch BSW is ON. Therefore, if engine 1 is stopped and the driving force is lost, the driver can easily increase a brake pedal load before the vehicle undesirably displaces backwards on a slope.

II) Water temperature of the engine is over a certain value. This is a condition because the stop/actuation operation of engine 1 should be carried out when engine 1 is in stable conditions. In a cold area, if the water temperature is low, engine 1 may not restart.

III) Vehicle speed reaches 5 km/h once after engine actuation. This is a condition for facilitating a steering operation at a garage while the vehicle moves in creep running. The steering operation at a garage will be time-consuming if engine 1 is stopped whenever the vehicle stops for changing steering directions.

IV) Positioning switch PSW and Mode switch MSW select other than the R range/D range (S mode)/L range, i.e., the N range/D range (D mode)/P range is selected. This is a condition for the following reasons. A steering operation at a garage while selecting the R or L range will be time-consuming if engine 1 is stopped whenever the vehicle stops for changing steering directions. When the positioning switch PSW selects the D range and the mode switch MSW selects S the mode, the driver is expecting the vehicle to perform a quick start operation.

V) Capacity of the battery is over a certain value. This is a condition because if the remaining capacity of the battery is not enough to restart engine 1, the motor cannot actuate engine 1 after stopping the engine.

VI) Electricity consumption is below a certain value. This is a condition for securing sufficient electrical supply to loads.

VII) Load of the constant pressure chamber of the master power MP is over a certain value. This is a condition because the smaller negative pressure in the constant pressure chamber of the master power MP, the smaller amplification of the brake load when depressing the brake pedal BP, leads to deteriorated braking performance. Because negative pressure in the constant pressure chamber is obtained from the intake pipe of engine 1, negative pressure in the constant pressure chamber becomes far smaller if engine 1 is stopped at smaller negative pressures. This leads to reduced amplification of the brake load when the driver depresses the brake pedal BP, and hence results in deteriorated braking performance.

VIII) Accelerator pedal is not depressed (TH OFF). This is a condition because the driver does not intend further increase of the driving force, engine 1 may be automatically stopped.

IX) All the automatic engine stop conditions at FI/MG ECU 4 are satisfied. This is a condition because if all the engine stop conditions determined at FI/MG ECU 4 are not satisfied, it is not preferable to carry out the automatic engine stop operation.

X) Vehicle speed is 0 km/h. This is a condition because the driving force is not required when the vehicle stops.

XI) Ratio of the CVT is low. This is a condition because a smooth starting operation of the vehicle is not carried out unless the ratio of the CVT (pulley ratio) is low.

XII) Oil temperature of the CVT is over a certain value. This is a condition because if the oil temperature of the CVT 3 is low, the start-up for hydraulic pressure of the starting clutch will cause a delay. Therefore, the required time from the engine actuation to the strong creep condition is extended, and the vehicle will displace backwards on a slope.

XIII) Accelerator pedal is not depressed (TH OFF). This is a condition because if the driver does not intend the further increment the driving force, engine 1 may be automatically stopped.

XIV) Brake fluid pressure retaining apparatus RU is normal. This is a condition because the brake fluid pressure may not be retained if the brake fluid pressure retaining apparatus RU (RU(A) or RU(B)) is out of order, therefore, the strong creep condition is kept for preventing the vehicle from undesirable backward displacement.

XV) (1) Brake fluid pressure is retained (solenoid valve SV in shut-off position) and Brake switch BSW is ON or (2) Positioning switch PSW selects N range/P range. This is a condition for the following reasons:

(1) As long as the brake fluid pressure is retained, the vehicle does not displace backwards on a slope even if engine 1 is automatically stopped and the driving force is lost. Further, when the brake switch BSW is ON, the driver places his foot on the brake pedal BP. Therefore, if engine 1 is stopped and the driving force is lost, the driver can easily increase a brake pedal load before the vehicle undesirably displaces backwards on a slope.

(2) If the vehicle stops with the positioning switch PSW selecting the P or N range, the driver intends to pull up the vehicle. Therefore, engine 1 may be automatically stopped. In this condition, engine 1 is automatically stopped even if the solenoid valve SV is not actuated.

Conditions for Releasing Retained Brake Fluid Pressure

Conditions under which the brake fluid pressure retaining apparatus RU releases the retained brake fluid pressure will be described.

In case of releasing retained brake fluid pressure

Figure 9A:
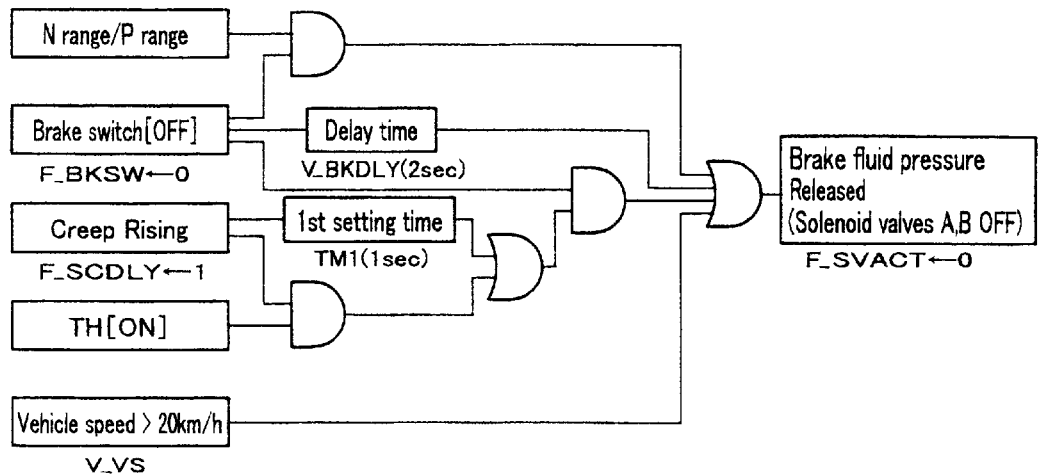
FIG. 9A shows the logic for releasing the retained brake fluid pressure when the vehicle does not undesirably roll down a slope.

As shown in FIG. 9A, if backward displacement of the vehicle is not detected, the brake fluid pressure is released when any of the following conditions is satisfied:

I) Positioning switch PSW selects N range/P range and Brake switch BSW is OFF;

II) A certain delay time (V_BKDLY) has passed after Brake switch BSW becomes OFF;

III) Brake switch BSW is OFF and First setting time TM1 has passed after Creep rising;

IV) Brake switch BSW is OFF, Creep has risen and Accelerator pedal is ON; or

V) Vehicle speed is over 20 km/h.

When any of the above conditions is satisfied, the solenoid valve SV is switched to the communicating position for releasing the retained brake fluid pressure.

Each of the above conditions will be described.

I) Positioning switch PSW selects N/P range and Brake switch BSW is OFF. This is a condition for eliminating unnecessary operation of the brake fluid pressure retaining apparatus RU.

II) A certain delay time has passed after Brake switch BSW becomes OFF. This is a condition because it is not preferable, as a fail-safe measure that the braking force be permanently retained after releasing the brake pedal BP because brake dragging occurs. In the preferred embodiment, the delay time is about 4 seconds after releasing the brake pedal BP, i.e. after the brake switch BSW is OFF. The delay time is set in consideration of the second setting time TM2.

III) Brake switch BSW is OFF and First setting time TM1 has passed after Creep rising. This is for eliminating a sudden impact at a start due to an instant release of the braking force. When the creep has risen (viz. when the strong creep condition has been achieved), the vehicle can be stopped stationarily against the slope if the brake fluid pressure retaining apparatus RU (solenoid valve SV) is not being actuated. Therefore, there is no need to retaining brake fluid pressure within the wheel cylinder WC for preventing the vehicle from undesirably rolling down a slope. Further, when the depression of the brake pedal BP is released (viz. when the brake switch BSW is OFF), the driver does not require the assistance of the braking force. However, if the retained brake fluid pressure that is the retained braking force is released instantly at a time when the brake switch BSW is OFF and the creep has risen, a sudden impact will arise at a start of the vehicle. Therefore, the driver feels an awkward feel or brake dragging. For this reason, time-counting of the timer is initiated when the creep has risen, and the solenoid valve SV is OFF (communicating position) to release the retained brake fluid pressure after the first setting time TM1 (viz. 1 second) has passed.

The brake fluid pressure retaining apparatus RU gradually decreases the brake fluid pressure (braking force) through the restriction D after the depression of the brake pedal BP is released or loosened. Therefore, if the retained brake fluid pressure is released when the first setting time TM1 passes, the aforementioned sudden impact will not arise.

IV) Brake switch BSW is OFF, Creep has risen and Accelerator pedal is ON. This is for eliminating undesirable and unnecessary brake dragging when the driver intends further increment of the driving force. When the creep has risen (viz. when the strong creep condition has been achieved), the vehicle can be stopped stationarily against the slope if the brake fluid pressure retaining apparatus RU (solenoid valve SV) is not being actuated. Therefore, there is no need to retaining brake fluid pressure within the wheel cylinder WC for preventing the vehicle from undesirably rolling down a slope. Further, when the depression of the brake pedal BP is released (viz. when the brake switch BSW is OFF), the driver does not require the assistance of the braking force. Moreover, because the driver has depressed the accelerator pedal (TH[ON]), the driver intends further increment of the driving force. Therefore, in order to prevent brake dragging and a delay due to the first setting time TM1 as the above condition III), even if the first setting time TM1 has not passed after the creep rising, the solenoid valve SV is turned OFF or open to release the retained brake fluid pressure when the accelerator pedal is depressed.

V) Vehicle speed is over 20 km/h. This is a condition for eliminating unnecessary brake dragging as a fail-safe measure.

In Case of Detecting Undesirable Backward Displacement of the Vehicle

Figure 9B:
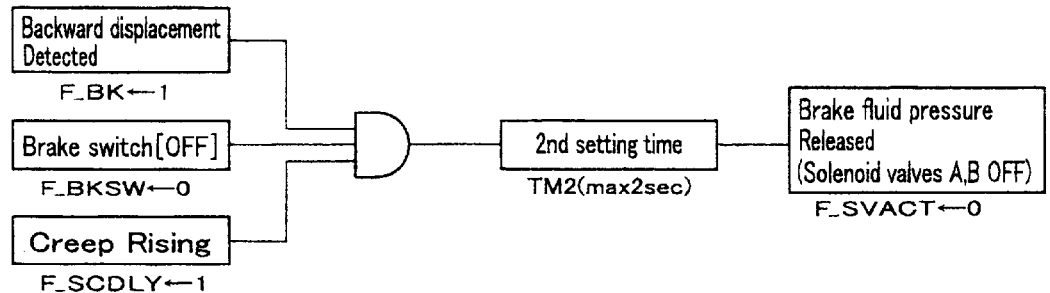
FIG. 9B shows the logic for releasing the retained brake fluid pressure when the vehicle undesirably rolls down a slope.

As shown in FIG. 9B, when undesirable backward displacement of the vehicle is detected, the retained brake fluid pressure is released on condition that the following condition is satisfied:

I) Backward displacement is detected, Brake switch is OFF and Second setting time TM2 has passed after Creep rising.

When the above condition is satisfied, the solenoid valve SV is switched to the communicating position to release the retained brake fluid pressure.

The backward displacement amount will be increased if the retained brake fluid pressure is released, while the vehicle is undesirably rolling down a slope, after the first setting time TM1 has passed. For this reason, the above condition is required for decreasing the backward displacement amount of the vehicle. In this condition, the brake fluid pressure is retained until the second setting time TM2 that is longer than the first setting time TM1 passes.

The second setting time TM2 is set to be shorter between 2 seconds and 0 second as the depression amount of the accelerator pedal (throttle angle signal V_θTH) becomes greater (FIG. 4B). For this reason, depending on the depression force of the accelerator pedal, the second setting time TM2 may be shorter than the first setting time TM1. In this event, because the depression amount of the accelerator pedal is great, the driving force of engine 1 (motor 2) is great. Thereby, even if the retained brake fluid pressure is released when the second setting time TM2 that is shorter than the first setting time TM1 passes, the backward displacement amount of the vehicle is kept smaller. Further, because the brake fluid pressure is released after a short time, unnecessary brake dragging can be eliminated.

Requirement for Creep Rising Condition

The requirement for a creep rising condition will be described.

Figure 9C:
FIG. 9C shows the logic for determining a creep rising condition.

As shown in FIG. 9C, the creep rising is determined based on the condition whether the driving force is increased to the strong creep condition. This condition is determined at the driving force control unit DCU. When the creep has risen (viz. when the strong creep condition is achieved), the driving force has been increased to such an extent that the vehicle does not undesirably roll down a slope having an inclination angle of 5 degrees even if the brake fluid pressure retaining apparatus RU releases the retained brake fluid pressure and the braking force does not act on the vehicle any longer. The determination whether or not the driving force has been increased to the strong creep condition is carried out based on the hydraulic pressure command value to a linear solenoid valve of CVT 3, where the engagement hydraulic pressure of the starting clutch is controlled.

Conditions Required for Strong Creep Order

Conditions for a strong creep order will be described. The strong creep order (F_SCRP) is transmitted when any of the following two conditions shown in FIGS. 10A and 10B is satisfied, and the strong creep condition is achieved.

First Condition

Figure 10A:
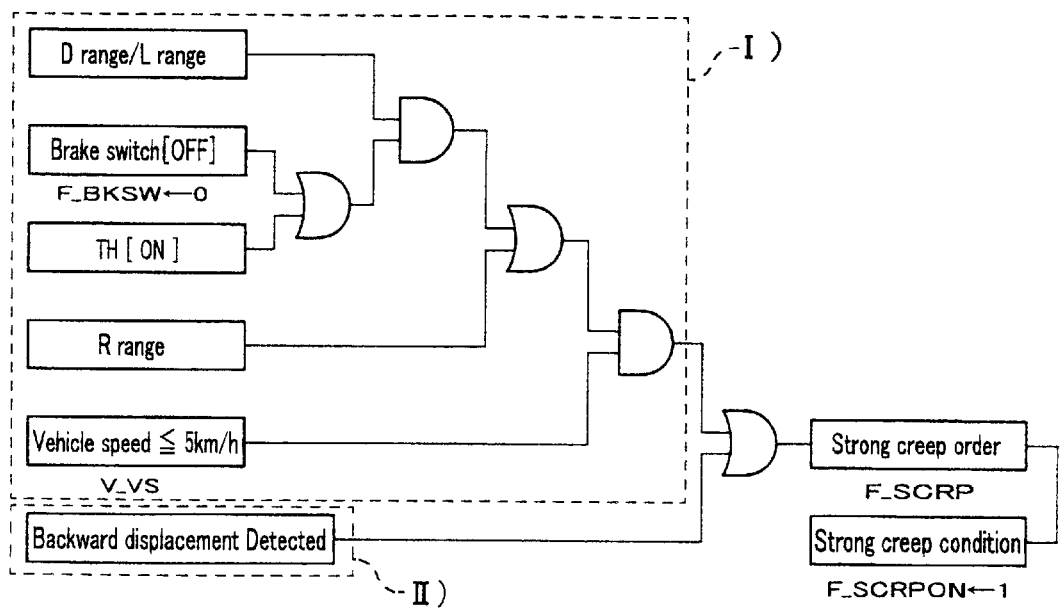
Figure 10B:
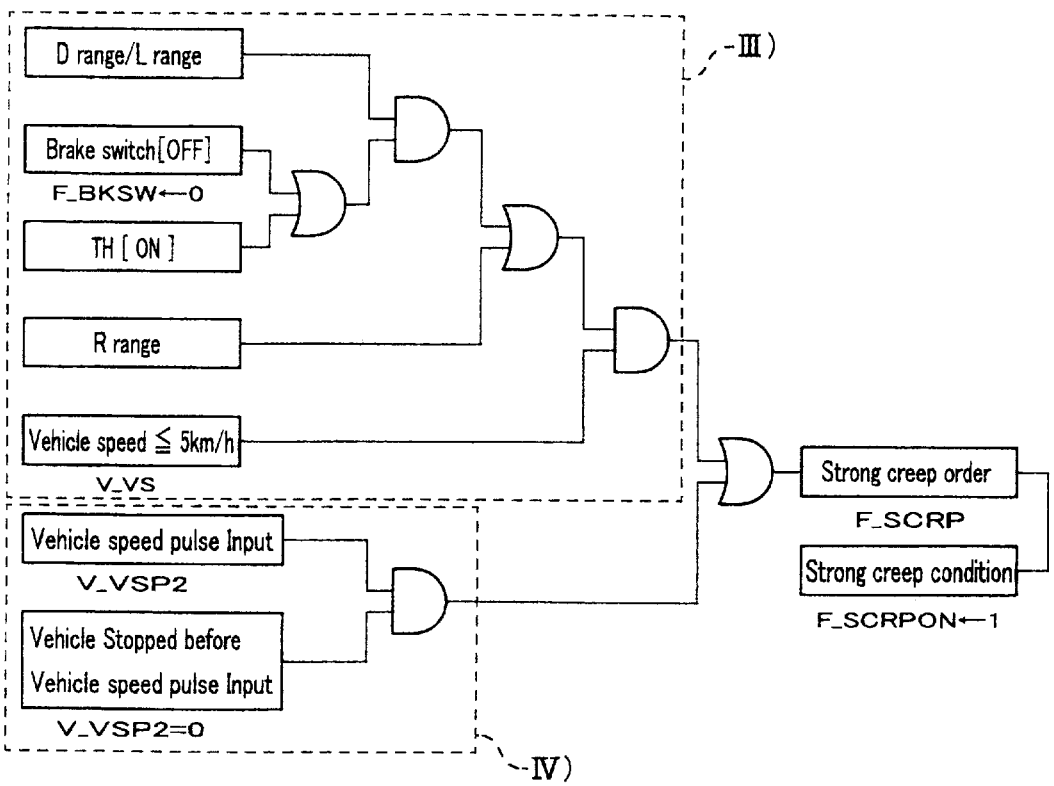

As shown in FIG. 10A, the first condition required for the strong creep order is that either I) or II) is satisfied.

I) [(1) Brake switch BSW is OFF or Accelerator pedal is depressed (TH[ON]), and Positioning switch PSW selects an advance range (D/L rage) or (2) Positioning switch PSW selects the reverse (R) range] and (3) Vehicle speed is at 5 km/h or lower.

II) Backward displacement of the vehicle is detected.

Second Condition

Meanwhile, as shown in FIG. 10B, the second condition required for the strong creep order is that either III) or IV) is satisfied.

III) [(1) Brake switch BSW is OFF or Accelerator pedal is depressed (TH[ON]), and Positioning switch PSW selects an advance range (D/L range) or (2) Positioning switch PSW selects the reverse (R) range] and (3) Vehicle speed is at 5 km/h or lower.

IV) Vehicle speed pulse is inputted and Vehicle is fully stopped before the input of vehicle speed pulse.

In the first and the second conditions required for the strong creep order, I) and III) are identical, while II) and IV) are different. Therefore, explanation of the condition III) is omitted. Conditions I) to IV) are determined at the driving force control unit DCU.

Each of the above conditions will be described below.

First, (1) to (3) of condition I) will be described. However, because they are identical to those of the condition III), an explanation is omitted with regard to (1) to (3) of condition III).

(1) Brake switch BSW is OFF or Accelerator pedal is depressed (TH[ON]), and Positioning switch PSW selects an advance range (D/L rage). This is a condition because when the driver initiates a starting operation, the driving force is changed to the strong creep condition. The driver intends to start the vehicle because the positioning switch PSW is set to the D or L range and further depression of the brake pedal BP is released or instead, the accelerator pedal is depressed. Therefore, the driving force is switched from the weak creep condition to the strong creep condition.

When the accelerator pedal is depressed, the driving force transmission capacity increases, even after reaching the greater driving force transmission capacity, to a capacity that allows transmission of all the driving force generated at the driving motor (condition greater than the greater driving force transmission capacity). However, the flag indicating the strong creep condition (F_SCRPON) is kept until another flag rises.

(2) Positioning switch PSW selects the reverse (R) range. This is a condition for ensuring smooth creep driving in R range. When the positioning switch PSW is set to the R range, the driver expects a steering operation at a garage with the driving force switched to the strong creep condition. Therefore, the driving force is switched from the weak creep condition to the strong creep condition.

(3) Vehicle speed at 5 km/h or lower. This is a condition because the strong creep condition for driving at a vehicle speed over 5 km/h can be distinguished from the strong creep condition at a vehicle speed of 5 km/h or lower.

II) Backward displacement of the vehicle is detected. When the vehicle starts to displace backwards on a steep slope with the backward displacement force derived from the vehicle's own weight being greater than the braking force, the driving force in the strong creep condition prevents the backward displacement of the vehicle. When the vehicle stops on an up slope, the total amount of the driving force in the weak creep condition (driving force is zero if engine 1 is automatically stopped) and the braking force resists the backward displacement force of the vehicle. However, because the greater the inclination angle of the slope, the greater backward displacement force, the vehicle starts to displace backwards on the steep slope with the backward displacement force being greater than the total amount of the driving force in the weak creep condition and the braking force. For this reason, when backward displacement of the vehicle is detected, the driving force is switched from the weak creep condition to the strong creep condition in any circumstances to generate sufficient driving force against the slope.

III) The explanation of this condition will be omitted as mentioned above.

IV) A vehicle speed pulse is inputted and the vehicle is fully stopped before the input of the vehicle speed pulse. This is a condition for the following reason. When the vehicle displaces from the fully stopped position, backward displacement (possible backward displacement) of the vehicle is detected and then the driving force is switched to the strong creep condition to keep the vehicle against the slope. Although displacement of the vehicle is detected, a determination is not carried out to specify the direction as to whether the vehicle moves forward or backwards. When the vehicle stops on an up slope, the total amount of driving force in the weak creep condition (driving force is zero if engine 1 is automatically stopped) and braking force resists the backward displacement force of the vehicle. However, because the greater the inclination angle of the slope, the greater the backward displacement force, the vehicle starts to displace forward (on a down slope) or backwards (on an up slope) with the displacement force derived from the vehicle's own weight being greater than the total amount of the driving force in the weak creep condition and the braking force. For this reason, when forward or backward displacement (i.e. displacement) of the vehicle is detected, the driving force is switched from the weak creep condition (or the engine stop condition) to the strong creep condition to generate sufficient driving force against the slope. For the purpose of the detecting that the vehicle stops completely, the vehicle speed pulse of zero is detected before a vehicle speed pulse is inputted. Displacement of the vehicle is detected even from one vehicle speed pulse input. The driving force may be switched to the strong creep condition even if the vehicle displaces in the same direction in which the driver intends to move.

Conditions for Automatically Actuating the Engine

Figure 11B:
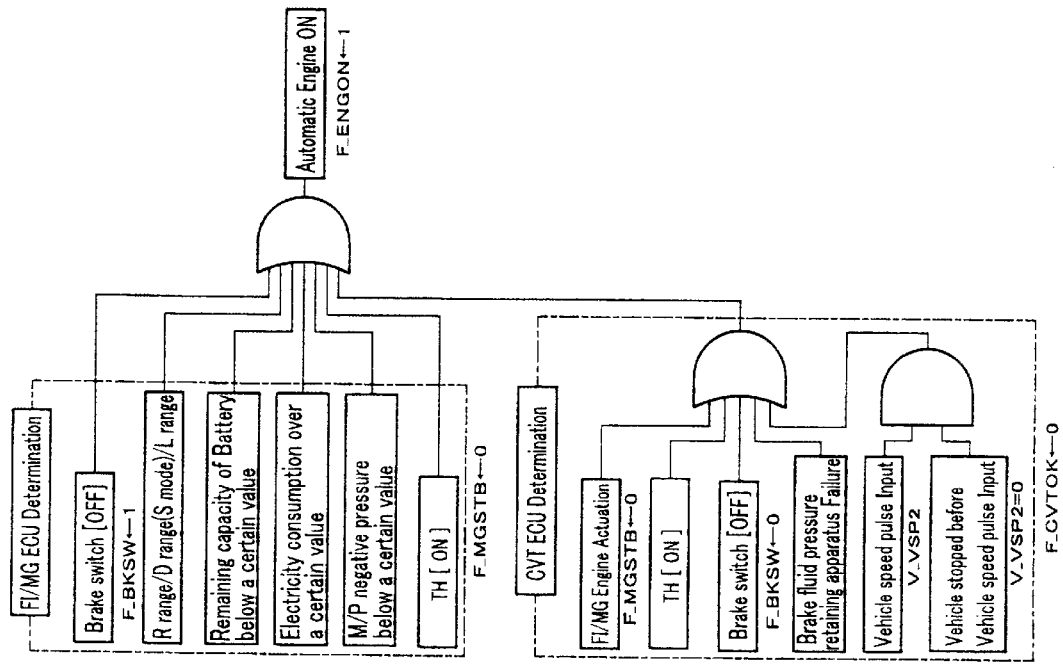
Figure 11A:
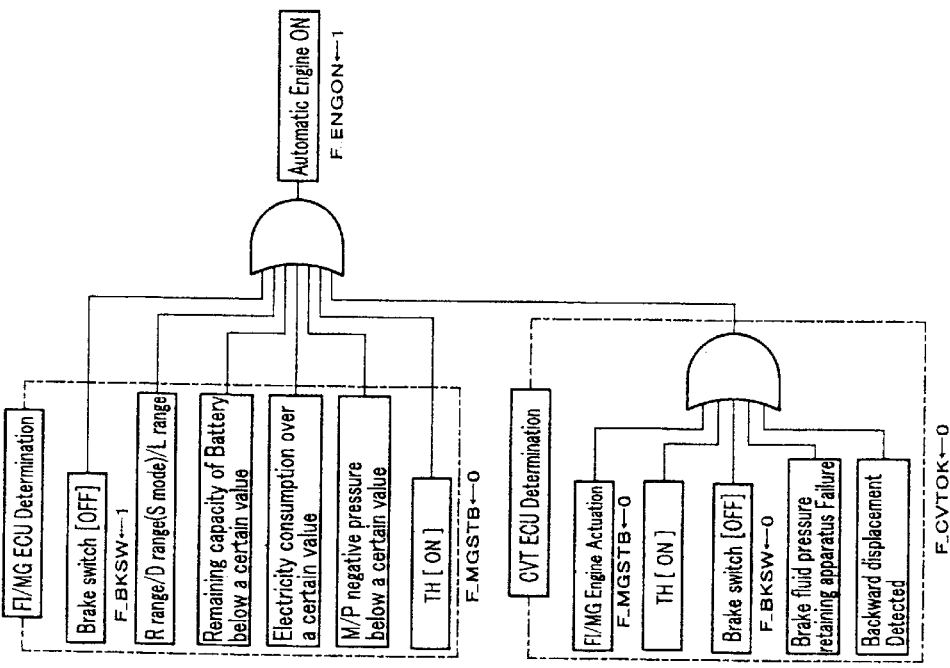

After automatically stopping engine 1, engine 1 is automatically restarted in the following conditions. When any of the following conditions shown in FIGS. 11A and 11B is satisfied, an automatic engine actuation order (F_ENGON) is transmitted and engine 1 is automatically actuated. The automatic engine actuation is carried out by the driving motor stopping unit. Therefore, the following automatic engine actuation conditions are determined at the driving motor stopping unit. Specifically, the automatic engine actuation conditions are determined at FI/MG ECU 4 and CVT ECU 6. When FI/MG ECU 4 determines that any of the following conditions I) to VI) is satisfied, F_MGSTB becomes 0. When CVT ECU 6 determines that any of the following conditions VII) to XI) [or VII] to X] and XII]] is satisfied, F_CVTOK becomes 0. When at least one of the signals F_MGSTB and F_CVTOK becomes 0, the automatic engine actuation order (F_ENGON) is transmitted. The first condition required for the automatic engine actuation order (shown in FIG. 11A) is the same as the second condition shown in FIG. 11B, except for the conditions XI) and XII) which are determined by CVT ECU 6. Therefore, the explanation refers only to the condition XII) as to the second condition thereof.

I) Depression of the brake pedal BP is released (Brake switch BSW is OFF). This is a condition because the determination of the starting operation is carried out when the driver releases the brake pedal BP. When the driver releases the brake pedal BP in the D range/D mode, it is assumed that the driver initiates the starting operation. Therefore, engine 1 is automatically actuated. Meanwhile, when the driver releases the brake pedal BP in P or N range to stop and exit the vehicle, engine 1 is automatically actuated in order to remind the driver not to exit the vehicle without turning off the ignition switch.

II) Positioning switch PSW and Mode switch MSW select R 15 range/D range (S mode)/L range. This is a condition because the driver intends to start the vehicle quickly if the transmission is set in the R range/D range (S mode)/L range after engine 1 is stopped. Therefore, when engine 1 is stopped with the transmission set in other than the R range/D range (S mode)/L range and thereafter switched to the R range/D range (S mode)/L range, engine 1 is automatically actuated.

III) Remaining capacity of the battery is below a certain value. This is a condition because engine 1 is not automatically actuated if the remaining capacity of the battery is too low. Engine 1 is not stopped unless the remaining capacity of the battery is above a certain value. However, the capacity of the battery may lower after engine 1 is automatically stopped. In this case, engine 1 is automatically actuated for the purpose of charging the battery. The certain value is set to be higher than the critical battery capacity, below which engine 1 is not actuated.

IV) Electricity consumption is above a certain value. While components that consume electricity, such as lights, are on, the capacity of the battery decreases quickly. As a result, engine 1 will not be restarted. For this reason, irrespective of the remaining capacity of the battery, engine 1 is automatically actuated when the electricity consumption is above a certain value.

V) Negative pressure of the master power MP is below a certain value. This is a condition because the lower the negative pressure at the master power MP, the lower the obtained braking force. Therefore, engine 1 is restarted to secure sufficient braking force.

VI) Accelerator pedal is depressed (TH ON). This is a condition because the driver is expecting driving force from engine 1. Therefore, engine 1 is automatically actuated when the accelerator pedal is depressed.

VII) Automatic engine actuation condition at FI/MG ECU 4 is satisfied. This is a condition because CVT ECU 6 also determines the automatic engine actuation conditions of FI/MG ECU 4.

VIII) Accelerator pedal is depressed (TH ON). This is a condition because the driver is expecting driving force from engine 1. Therefore, engine 1 is automatically actuated when the accelerator pedal is depressed.

IX) Depression of the brake pedal BP is released (Brake switch BSW is OFF). This is a condition because determination of the starting operation is carried out when the driver releases the brake pedal BP. When the driver releases the brake pedal BP in the D range/D mode, it is assumed that the driver initiates the starting operation. Therefore, engine 1 is automatically actuated.

X) Brake fluid pressure retaining apparatus RU is out of order. This a condition because when the brake fluid pressure retaining apparatus RU is out of order and the brake fluid pressure is not retained, the vehicle displaces backwards (forward) on a slope with the automatic engine stop operation. Therefore, when solenoid valves SV(A), SV(B) are out of order, engine 1 is automatically actuated and the vehicle is kept in the strong creep condition.

If a failure is detected in the brake fluid pressure retaining apparatus RU after stopping engine 1, engine 1 is immediately actuated such that the driving force of the vehicle is kept in the strong creep condition. This is because the brake fluid pressure may not be retained after releasing the brake pedal BP upon starting the vehicle. In other words, it is the strong creep condition that prevents the vehicle from undesirable backward displacement and facilitates a smooth starting operation of the vehicle. The failure-detecting unit DU detects a malfunction of the brake fluid pressure retaining apparatus RU.

XI) Backward displacement of the vehicle is detected. This is a condition because when the vehicle starts to displace backwards on a steep slope with the backward displacement force derived from the vehicle's own weight being greater than braking force, the vehicle is prevented from backward displacement by the driving force of engine 1. When the vehicle stops on an up slope, the braking force resists the backward displacement force of the vehicle. However, because the greater the inclination angle of the slope the greater the backward displacement force, the vehicle starts to displace backwards on the steep slope with the backward displacement force being greater than the braking force. For this reason, when backward displacement of the vehicle is detected, the driving force is switched from the engine stop condition to the strong creep condition in any circumstances to generate sufficient driving force against the slope. Because the method of detecting backward displacement of the vehicle has been explained in Conditions required for Strong Creep Order section, further explanation will be omitted.

XII) A vehicle speed pulse is inputted and the vehicle is fully stopped before the input of the vehicle speed pulse. This is a condition for the following reason. When the vehicle displaces from the fully stopped position, backward displacement (possible backward displacement) of the vehicle is detected and then engine 1 is automatically actuated to generate driving force against the slope. Although displacement of the vehicle is detected, a determination is not carried out to specify the direction as to whether the vehicle moves forward or backwards. When the vehicle stops on an up slope with engine 1 stopped, only the braking force resists the backward displacement force of the vehicle. However, because the greater the inclination angle of the slope, the greater the backward displacement force, the vehicle starts to displace forward (on a down slope) or backwards (on an up slope) with the displacement force derived from the vehicle's own weight being greater than the braking force. For this reason, when forward or backward displacement (i.e. displacement) of the vehicle is detected, engine 1 is automatically actuated from the engine stop condition to the strong creep condition so as to generate a driving force sufficient to resist the slope. For the purpose of detecting that the vehicle stops completely, the vehicle speed pulse of zero is detected before a vehicle speed pulse is inputted. Displacement of the vehicle is detected even from one vehicle speed pulse input.

Time Chart for Control

With reference to two time charts shown in FIGS. 12 and 13, the way of controlling the vehicle having the above system will be described. The vehicle is operated in the order of braking, stopping and starting.

Figure 12:
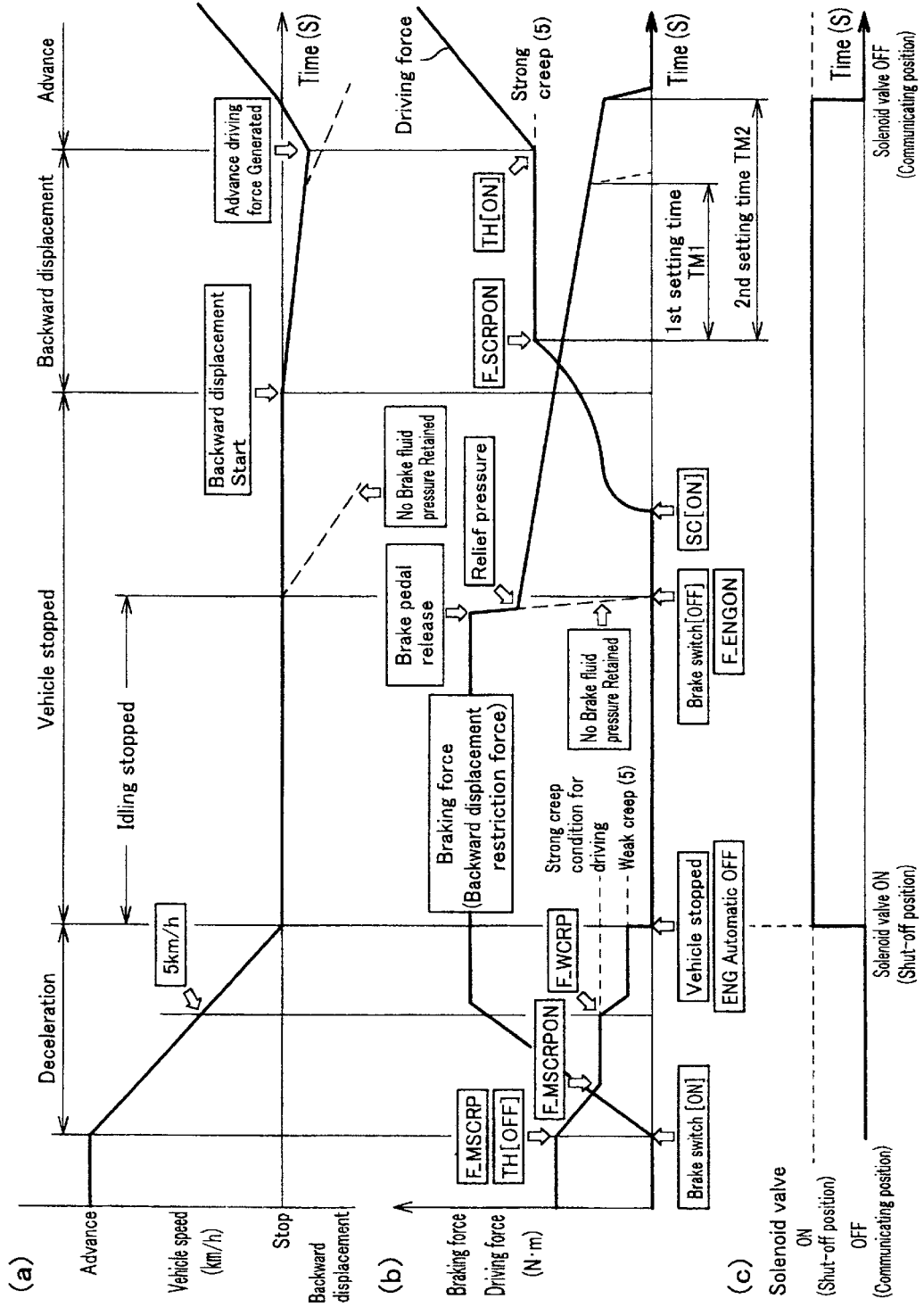
FIG. 12 is a time chart for the control of the vehicle equipped with a brake fluid pressure retaining apparatus according to the present invention, in which the engine is automatically stopped. The figure is shown in time sequential order. Herein, (a) indicates change in the vehicle speed, (b) indicates the relationship between driving force and braking force, and (c) indicates the conditions (ON/OFF) of solenoid valves.
Figure 13:
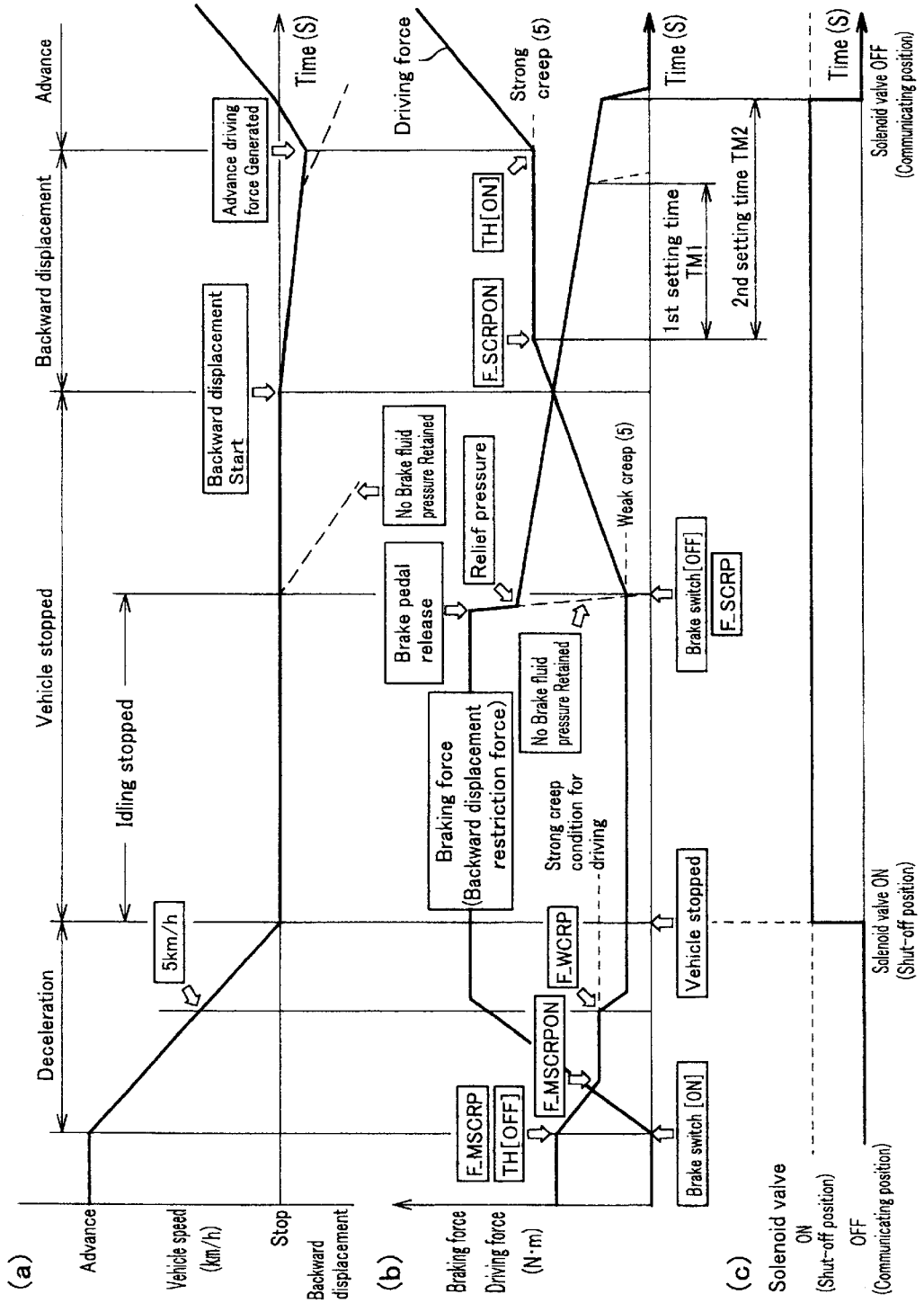
FIG. 13 is a time chart for the control of the vehicle equipped with a brake fluid pressure retaining apparatus according to the present invention, in which the engine is not automatically stopped. The figure is shown in time sequential order. Herein, (a) indicates change in the vehicle speed, (b) indicates the relationship between driving force and braking force, and (c) indicates the conditions (ON/OFF) of solenoid valves.

In the time charts shown in FIGS. 12(b) and 13(b), a thick line indicates the driving force and a thin line indicates the braking force. In FIGS. 12 and 13, the time scale after releasing the brake pedal BP is extended in comparison with that before releasing the brake pedal BP.

Time Chart for Control (1) with Automatic Engine Stop Operation

With reference to FIG. 12 and FIG. 1, the time chart for control (1) with automatic engine stop operation will be described.

In the control in this time chart (1), the driving force is changed by the driving force control unit DCU from the strong creep condition for driving to the weak creep condition, and further engine 1 is stopped by the driving motor stopping unit (not shown). The positioning switch PSW and the mode switch MSW of the vehicle are not changed from the D range/D mode. The brake fluid pressure retaining apparatus RU comprises a relief valve RV and a check valve CV. The vehicle stops on an up slope.

The driving force control unit DCU transmits a strong creep order for driving (F_MSCRP) when the driver releases the accelerator pedal (TH[OFF]) while the vehicle is running (vehicle speed >5 km/h). The driving force is then switched to the strong creep condition for driving (F_MSCRPON), which is less than the strong creep condition (F_SCRPON).

If the driver depresses the brake pedal BP (brake switch BSW[ON]), the braking force increases. When the vehicle speed falls to 5 km/h with continued braking application, the driving force control unit DCU transmits a weak creep order (F_WCRP) and driving force is switched to the weak creep condition (F_WCRPON). When doing so, because the driving force decreases to the weak creep condition through the strong creep condition for driving, the driver does not experience a strong deceleration.

When the vehicle speed falls to 0 km/h, the brake fluid pressure retaining apparatus RU switches the solenoid valve SV to the shut-off position (FIG. 12(c)) to retain brake fluid pressure (braking force) within the wheel cylinder WC. Further, the driving motor stopping unit automatically stops engine 1 (F_ENGOFF) and the driving force is lost. Because engine 1 is stopped through the weak creep condition, the driver has depressed the brake pedal BP to such an extent that the vehicle does not roll down a slope. Therefore, the braking force prevents undesirable backward displacement of the vehicle, even if engine 1 is automatically stopped. With the provision of a check valve CV, the driver can increase the braking force by further depression of the brake pedal BP even if the solenoid valve SV is in the shut-off position. The reason for automatically stopping engine 1 is that improved fuel consumption and reduction of exhaust gas can be achieved when idling is stopped.

The driver then releases the brake pedal BP in order to prepare for restarting the vehicle. If the diver depresses the brake pedal BP more than a preset pressure of the relief valve RV (relief pressure), the relief valve RV actuates upon the driver releasing the brake pedal BP and the braking force immediately decreases to the relief pressure. Providing the relief valve RV ensures a smooth starting operation of the vehicle on a slope, even if the driver depresses the brake pedal BP more than is required.

As shown in FIG. 12(b), a phantom line extends downward from "Relief pressure" on the line indicating braking force. The phantom line indicates a situation in change of the braking force where the brake fluid pressure is not retained (viz. returned conditions of the brake pedal BP). When the braking force instantly decreases to zero, the vehicle displaces backwards, such as shown by the phantom line at a mid part of FIG. 12(a).

When the depression of the brake pedal BP is released and the brake fluid pressure decreases below the relief pressure, the brake fluid pressure within the wheel cylinder WC gradually decreases through the restriction D of the brake fluid pressure retaining apparatus RU, and accordingly the braking force gradually decreases.

When the depression of the brake pedal BP is released, the brake switch BSW becomes OFF. And the automatic engine actuation order (F_ENGON) is transmitted. After a time lag derived from a delay of signal communication and mechanisms, engine 1 is automatically actuated and the supply of pressure oil to the starting clutch at CVT 3 is initiated (SC [ON]).

Hydraulic oil has been discharged from the oil pressure chamber of the starting clutch at CVT 3 while engine 1 is stopped. Therefore, when engine 1 is actuated and the supply of pressure oil to the starting clutch is initiated, the driving force suddenly rises due to resistance of a piston enforcing the clutch. However, because the hydraulic oil within the oil pressure chamber is discharged, a clearance or play exists for the advance stroke of the piston. Therefore, the hydraulic pressure command value to the starting clutch does not correspond to the actual hydraulic pressure value (driving force transmission capacity); hence the driving force transmission capacity of the starting clutch increases little by little until the oil pressure chamber is filled with hydraulic oil. As a result, the driving force gradually increases, and when the oil pressure chamber is filled with hydraulic oil, the driving force then increases in accordance with the hydraulic pressure command value to the strong creep condition (F_SCRPON).

When doing so, because the solenoid valve SV is still in the shut-off position, the brake fluid flows toward the master cylinder MC merely through the narrow restriction D. The braking force, which is continuously retained after releasing the brake pedal BP, is gradually decreased.

When switched to the strong creep condition, the timer is actuated to release the retained brake fluid pressure.

Suppose the vehicle does not undesirably roll down a slope, i.e. the backward movement detection device BKD does not detect backward displacement of the vehicle. In this event, the brake fluid pressure retaining apparatus RU switches the solenoid valve SV to the communicating position when the first setting time TM1 passes (viz. when 1 second passes after switching to the strong creep condition). The retained brake fluid pressure is thereby released and the braking force falls to zero, such as shown by the phantom line of FIG. 12(*b*) extending downward from the point indicating the first setting time TM1. The brake fluid pressure is gradually decreased through the restriction D after the depression of the brake pedal BP is released and before the first setting time TM1 passes. For this reason, by the time the solenoid valve SV is switched to the communicating position (viz. the first setting time TM1 passes), the braking force becomes considerably small. Therefore, in the case that the vehicle does not undesirably displace backwards, a smooth starting operation without a sudden feel can be achieved even if the vehicle has stopped on a flat road surface or a down slope. Also, unnecessary brake dragging does not arise.

Meanwhile, in the time chart (1), the vehicle undesirably rolls down a slope (viz. backward displacement is detected by the backward movement detection device BKD), such as shown by the solid line of FIG. 12(*a*). Therefore, the release of the retained brake fluid pressure is carried out based on the second setting time TM2 instead of the first setting time TM1. As a result, the braking force is retained longer. Likewise the situation where the vehicle does not undesirably roll down a slope, if the retained brake fluid pressure is released when the first setting time TM1 passes, the backward displacement amount of the vehicle considerably increases such as shown by the phantom line of FIG. 12(*a*) extending at a right-hand side of the figure.

In this time chart (1), because the driver depresses the accelerator pedal (TH[ON]), a smooth starting operation of the vehicle can be achieved by the balance between the braking force gradually decreasing but retained for a long time and the increasing driving force. When the driver depresses the accelerator pedal, the second setting time TM2 required for releasing the retained brake fluid pressure is properly set based on the map as illustrated in FIG. 4B.

According to this map, the second setting time TM2 may become shorter than the first setting time TM1. That is the second setting time passes as soon as the driver depresses the accelerator pedal. In this instance, the generating driving force is also great and the backward displacement amount of the vehicle does not increase. Decreasing the second setting time TM2 corresponds with the driver's intention of quickly starting the vehicle without brake dragging and with a strong depression of the accelerator pedal.

Accordingly, when engine 1 is stopped and the vehicle starts from the engine stop condition, if the vehicle undesirably displaces backwards, the brake fluid pressure retaining apparatus RU retains brake fluid pressure for a long time in the relation with the depression amount of the accelerator pedal (throttle angle). Therefore, the backward displacement amount of the vehicle becomes small. The driver carries out various operations while the brake fluid pressure is retained. Further, the retained brake fluid is smaller, because of the restriction D, at a time of releasing (viz. when the solenoid valve SV is switched to the communicating position) as the brake fluid pressure retaining apparatus RU (solenoid valve) actuates longer. This ensures a smooth starting operation of the vehicle.

Likewise the vehicle disclosed in the preferred embodiment of Japanese Patent Application No. 11-164621 (unpublished), even if the vehicle does not displace backwards, a smooth starting operation can be achieved by the first setting time TM1 (delay time) and the restriction D. In a down slope, the driver can start off the vehicle merely by loosening the brake pedal BP without fully releasing the depression of the brake pedal BP (brake switch BSW is ON). Even in this instance, a smooth starting operation can be achieved by the action of the restriction D.

Further, in this brake fluid pressure retaining apparatus RU, it is not necessary to determine whether the vehicle stops on a slope or a flat surface, and therefore there is no need to provide means for detecting a slope.

Time Chart for Control (2) without Automatic Engine Stop Operation

With reference to FIG. 13 and FIG. 1, the time chart for control (2) without automatic engine stop operation will be described.

In the control in this time chart (2), the driving force is changed by the driving force control unit DCU from the strong creep condition for driving to the weak creep condition, and the weak creep condition is kept while the vehicle stops. The positioning switch PSW and the mode switch MSW of the vehicle are not changed from the D range/D mode. The brake fluid pressure retaining apparatus RU comprises a relief valve RV and a check valve CV. The vehicle stops on an up slope.

The operations after releasing the accelerator pedal (TH [OFF]) and before switching to the weak creep condition are the same as those shown in "Time Chart for Control (1) with Automatic Engine Stop Operation". Therefore, the explanation thereof will be omitted.

When the vehicle speed falls to 0 km/h, the brake fluid pressure retaining apparatus RU switches the solenoid valve SV to the shut-off position (FIG. 13(*c*)) to retain brake fluid pressure (braking force) within the wheel cylinder WC. Because engine 1 is stopped in the weak creep condition, the driver has depressed the brake pedal BP to such an extent that the vehicle does not roll down a slope. Therefore, the braking force prevents undesirable backward displacement of the vehicle. With the provision of a check valve CV, the driver can increase the braking force by further depression of the brake pedal BP even if the solenoid valve SV is in the shut-off position. The reason for stopping the vehicle in the weak creep condition is to eliminate drawbacks, such as vibration and deteriorated fuel consumption. In other words, if a relatively great driving force, such as the strong creep, is restricted by the braking force, vibration will arise and fuel consumption of the vehicle will be deteriorated.

Engine 1 is not automatically stopped because the vehicle is not provided with the driving force stopping unit, otherwise the automatic engine stop condition is not satisfied in the case that the vehicle is equipped with the driving force stopping unit.

The driver then releases the brake pedal BP in order to prepare for restarting the vehicle. If the diver depresses the brake pedal BP more than a preset pressure of the relief valve RV (relief pressure), the relief valve RV actuates upon the driver releasing the brake pedal BP and the braking force immediately decreases to the relief pressure. Providing the relief valve RV ensures a smooth starting operation of the vehicle on a slope, even if the driver depresses the brake pedal BP more than is required.

As shown in FIG. 13(b), a phantom line extends downward from "Relief pressure" on the line indicating braking force. The phantom line indicates a situation in change of the braking force where the brake fluid pressure is not retained (viz. returned conditions of the brake pedal BP). When the braking force instantly decreases to zero, the vehicle displaces backwards, such as shown by the phantom line at a mid part of FIG. 13(a).

When the depression of the brake pedal BP is released and the brake fluid pressure decreases below the relief pressure, the brake fluid pressure within the wheel cylinder WC gradually decreases through the restriction D of the brake fluid pressure retaining apparatus RU, and accordingly the braking force gradually decreases. When the depression of the brake pedal BP is released, the brake switch BSW becomes OFF. And the strong creep order (F_SCRP) is transmitted.

The vehicle has been stopped in the weak creep condition. Therefore, the oil pressure chamber of the starting clutch at CVT 3 is filled with hydraulic oil. For this reason, no clearance or play exists for the advance stroke of the piston, and the hydraulic pressure command value to the starting clutch corresponds to the actual hydraulic pressure value (driving force transmission capacity); hence the driving force increases to the strong creep condition (F_SCRPON) in accordance with the hydraulic pressure command value. When doing so, because the solenoid valve SV is still in the shut-off position, the brake fluid flows toward the master cylinder MC merely through the narrow restriction D. As a result, the braking force gradually decreases. In other words, the braking force, which is continuously retained after releasing the brake pedal BP, is gradually decreased.

When switched to the strong creep condition, the timer is actuated to release the retained brake fluid pressure.

Suppose the vehicle does not undesirably roll down a slope, i.e. the backward movement detection device BKD does not detect backward displacement of the vehicle. In this event, the brake fluid pressure retaining apparatus RU switches the solenoid valve SV to the communicating position when the first setting time TM1 passes (viz. when 1 second passes after switching to the strong creep condition). The retained brake fluid pressure is thereby released and the braking force falls to zero, such as shown by the phantom line of FIG. 13(b) extending downward from the point indicating the first setting time TM1. The brake fluid pressure is gradually decreased through the restriction D after the depression of the brake pedal BP is released and before the first setting time TM1 passes. For this reason, the braking force gradually decreases, and by the time the solenoid valve SV is switched to the communicating position, the braking force becomes considerably small. Therefore, a smooth starting operation without a sudden feel can be achieved even if the vehicle has stopped on a flat road surface or a down slope. Also, unnecessary brake dragging does not arise.

Meanwhile, in the time chart (2), the vehicle undesirably rolls down a slope (viz. backward displacement is detected by the backward movement detection device BKD), such as shown by the solid line of FIG. 13(a). Therefore, the release of the retained brake fluid pressure is carried out based on the second setting time TM2 instead of the first setting time TM1. As a result, the braking force is retained longer. Likewise the situation where the vehicle does not undesirably roll down a slope, if the retained brake fluid pressure is released when the first setting time TM1 passes, the backward displacement amount of the vehicle considerably increases such as shown by the phantom line of FIG. 13(a) extending at a right-hand side of the figure. These are the same as Time Chart for Control (1).

In this time chart (2), because the driver depresses the accelerator pedal (TH[ON]), a smooth starting operation of the vehicle can be achieved by the balance between the braking force gradually decreasing but retained for a long time and the increasing driving force. When the driver depresses the accelerator pedal, the second setting time TM2 required for releasing the retained brake fluid pressure is properly set based on the map as illustrated in FIG. 4B. These are also the same as Time Chart for Control (1).

Accordingly, when the vehicle stops in the weak creep condition and then starts from the weak creep condition, if the vehicle undesirably displaces backwards, the brake fluid pressure retaining apparatus RU retains brake fluid pressure for a long time in the relation with the depression amount of the accelerator pedal (throttle angle). Therefore, likewise Time Chart for Control (1), the backward displacement amount of the vehicle becomes small. The driver carries out various operations while the brake fluid pressure is retained. Further, because of the restriction D, the longer the brake fluid pressure retaining apparatus RU retains the brake fluid pressure, the smaller the retained brake fluid pressure becomes. This ensures a smooth starting operation of the vehicle.

As described in the time chart (1), a smooth starting operation of the vehicle can be achieved even if the vehicle does not disclose backwards.

Additionally, stopping and starting operations on a down slope will be described for the vehicle equipped with the brake fluid pressure retaining apparatus RU (FIG. 2).

When the driver stops the vehicle on a down slope, the driver depresses the brake pedal BP. The control unit CU determines conditions whether the vehicle stops and the like, and then turns ON the solenoid valve SV (shut-off position) to retain brake fluid pressure (braking force) within the wheel cylinder WC.

The driver then releases the brake pedal BP to start off the vehicle on a down slope. On a down slope, the driver often starts off the vehicle due to the vehicle's own weight and without depressing the accelerator pedal. According to the brake fluid pressure retaining apparatus RU, even if the solenoid valve SV is in the shut-off position, the braking force gradually decreases through the restriction D after releasing or loosening the depression of the brake pedal BP. As a result, likewise a normal staring operation of the vehicle on a down slope, the driver can start off the vehicle without depressing the accelerator pedal and by the displacement force due to the vehicle's own weight.

While the invention has been described in detail and with reference to specific embodiments thereof, it will be apparent to one skilled in the art that various changes and modifications can be made therein without departing from the spirit and scope thereof.

For example, as long as backward displacement of the vehicle can be detected, the backward movement detection device may employ any known means other than helical gears. Also, the brake fluid pressure retaining apparatus may comprise a servo valve or passage-switching valve to be operated by electromagnetic means. Further, the second setting time may be set based on the rotational speed (Ne) of the engine or backward displacement velocity of the vehicle instead of the throttle angle ($\theta$TH).

What is claimed is:

1. A brake fluid pressure retaining apparatus in combination with a vehicle equipped with a driving force control unit, the driving force control unit which transmits a driving force from a driving motor to driving wheels when a transmission is set in a driving range even after a depression of an accelerator pedal is released at a certain or lower vehicle speed, and which switches the magnitude of the driving force transmitted to the driving wheels between a greater condition and a smaller condition in accordance with a depression of a brake pedal, so that the driving force is made smaller at a depression of the brake pedal than at a release of the brake pedal, the brake fluid pressure retaining apparatus comprising:

a brake fluid pressure passage connecting a master cylinder and a wheel cylinder;

a solenoid valve provided in the brake fluid pressure passage and switchable between a communicating position, where the brake fluid pressure passage communicates, and a shut-off position, where the brake fluid pressure passage is shut off;

a bypass passage equipped with a restriction for communicating the master cylinder and the wheel cylinder irrespective of the shut-off position of the solenoid valve; and a control unit for switching the solenoid valve between the communicating position and the shut-off position, wherein said control unit is constituted such that the solenoid valve is switched to the shut-off position for retaining brake fluid pressure within the wheel cylinder when the vehicle is stopped with the brake pedal depressed, and that the solenoid valve is switched to the communicating position for releasing the retained brake fluid pressure when a first setting time passes after the driving force is increased to the greater condition due to the release of the brake pedal, and wherein said brake fluid pressure retaining apparatus further comprises a backward movement state determination device for determining a backward movement state of the vehicle, and wherein said control unit is constituted such that when the vehicle is determined as being in a backward movement state, said solenoid valve is switched to the communicating position after a second setting time passes, so as to retain brake fluid pressure for a period longer than the first setting time.

2. A brake fluid pressure retaining apparatus according to claim 1, wherein said second setting time becomes shorter as the load of the driving motor increases.

3. A brake fluid pressure retaining apparatus in combination with a vehicle equipped with a driving force control unit, the driving force control unit which transmits a driving force from a driving motor to driving wheels when a transmission is set in a driving range even after a depression of an accelerator pedal is released at a certain or lower vehicle speed, and which switches the magnitude of the driving force transmitted to the driving wheels between a greater condition and a smaller condition in accordance with a depression of a brake pedal, so that the driving force is made smaller at a depression of the brake pedal than at a release of the brake pedal, the brake fluid pressure retaining apparatus comprising:

a brake fluid pressure passage connecting a master cylinder and a wheel cylinder;

a solenoid valve provided in the brake fluid pressure passage and switchable between a communicating position, where the brake fluid pressure passage communicates, and a shut-off position, where the brake fluid pressure passage is shut off;

a bypass passage equipped with a restriction for communicating the master cylinder and the wheel cylinder irrespective of the shut-off position of the solenoid valve; and a control unit for switching the solenoid valve between the communicating position and the shut-off position, wherein said control unit is constituted such that the solenoid valve is switched to the shut-off position for retaining brake fluid pressure within the wheel cylinder when the vehicle is stopped with the brake pedal depressed, and that the solenoid valve is switched to the communicating position for releasing the retained brake fluid pressure when a first setting time passes after the driving force is increased to the greater condition due to the release of the brake pedal, and wherein said brake fluid pressure retaining apparatus further comprises a backward movement state determination device for determining a backward movement state of the vehicle, and wherein said control unit is constituted such that when the vehicle is determined as being in a backward movement state, said solenoid valve is switched to the communicating position after a second setting time, which decreasingly changes from a time longer than the first setting time in accordance with the increment of the load of the driving motor, passes instead of the first setting time, so as to release the retained brake fluid pressure.

* * * * *